US011223565B2

(12) United States Patent
Buddhikot et al.

(10) Patent No.: US 11,223,565 B2
(45) Date of Patent: Jan. 11, 2022

(54) DESIGNS OF AN MPTCP-AWARE LOAD BALANCER AND LOAD BALANCER USING THE DESIGNS

(71) Applicant: Nokia Technologies Oy, Espoo (FI)

(72) Inventors: Milind M. Buddhikot, Bridgewater, NJ (US); Yijing Zeng, Madison, WI (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/770,816

(22) PCT Filed: Dec. 22, 2017

(86) PCT No.: PCT/US2017/068140
§ 371 (c)(1),
(2) Date: Jun. 8, 2020

(87) PCT Pub. No.: WO2019/125483
PCT Pub. Date: Jun. 27, 2019

(65) Prior Publication Data
US 2020/0389403 A1 Dec. 10, 2020

(51) Int. Cl.
*H04L 12/803* (2013.01)
*H04L 12/707* (2013.01)
(Continued)

(52) U.S. Cl.
CPC .......... *H04L 47/125* (2013.01); *H04L 45/24* (2013.01); *H04L 47/193* (2013.01); *H04L 47/215* (2013.01)

(58) Field of Classification Search
None
See application file for complete search history.

(56) References Cited

U.S. PATENT DOCUMENTS 10,362,496 B2 * 7/2019 Huang .................... H04L 45/24
10,412,159 B1 * 9/2019 McCullagh ......... H04L 67/1038
(Continued)

OTHER PUBLICATIONS

Hartung, Lance, et al., "Policy Drive Multi-band Spectrum Aggregation for Ultra-broadband Wireless Networks", IEEE, 2015, 12 pgs.

(Continued)

*Primary Examiner* — Anh Vu H Ly
(74) *Attorney, Agent, or Firm* — Harrington & Smith

(57) ABSTRACT

MPTCP connections and their corresponding TCP subflows are routed by a load balancer toward backends. Each MPTCP connection is routed to a single backend and is able to include primary and secondary TCP subflows. Routing includes performing, responsive to setting up a primary TCP subflow of an MPTCP connection, load balancing of the connection to select a backend for the connection. The MPTCP connections and their TCP subflows are tracked by the load balancer to route the MPTCP connections and their corresponding TCP subflows to corresponding selected backends. A backend determines whether a request by a client to set up a primary TCP subflow of an MPTCP connection already includes a key used to generate a token used to uniquely identify the MPTCP connection from other MPTCP connections. The backend generates the token based on the key. The backend uses the token to distinguish subsequent communications for the MPTCP connection.

24 Claims, 11 Drawing Sheets

(51) Int. Cl.
*H04L 12/801* (2013.01)
*H04L 12/819* (2013.01)

(56) References Cited

U.S. PATENT DOCUMENTS

2014/0310418 A1* 10/2014 Sorenson, III ...... H04L 67/1002 709/226
2015/0095502 A1* 4/2015 Le Bolzer ............... H04L 67/28 709/227
2018/0368042 A1* 12/2018 Jin ........................ H04W 36/18
2019/0068694 A1* 2/2019 Ripke .................... H04L 43/04

OTHER PUBLICATIONS

Patel, Parveen, et al., "Ananta: Cloud Scale Load Balancing", © 2013 ACM, 12 pgs.
Bagnulo, M., et al., "Analysis of Residual Threats and Possible Fixes for Multipath TCP (MPTCP)", IETF, RFC 7430, Jul. 2015, 19 pgs.
Bagnulo, M., "Threat Analysis for TCP Extensions for Multipath Operation with Multiple Addresses", IETF, RFC 6181, Mar. 2011, 17 pgs.
Ford, A., et al., "TCP Extensions for Multipath Operation with Multiple Addresses", IETF, RFC 6824, Jan. 2013, 64 pgs.
Olteanu, V., et al., "Layer 4 Loadbalancing for MPTCP draft-olteanu-mptcp-loadbalance-00", Internet Engineering Task Force, Jul. 8, 2016, 7 pgs.
Cisco, "Cisco Visual Networking Index: Global Mobile Data Traffic Forecast Update, 2016-2021", © 2017 Cisco, 35 pgs.
Eisenbud, Daniel E., et al., "Maglev: A Fast and Reliable Software Network Load Balancer", NDSI, Mar. 16-18, 2016, Santa Clara, CA, USA, 14 pgs.
DPDK, Data Plane Development Kit, http://dpdk.org/, Oct. 5, 2017, 2 pgs.
Duchene, F., et al., "Multipath TCP Load Balancing draft-duchene-mptcp-load balancing-01", IETF, Jul. 2017, 12 pgs.
Paasch, C., et al., "Multipath TCP behind Layer-4 loadbalancers draft-paasch-mptcp-loadbalancer-00", Sep. 2015, 8 pgs.

* cited by examiner

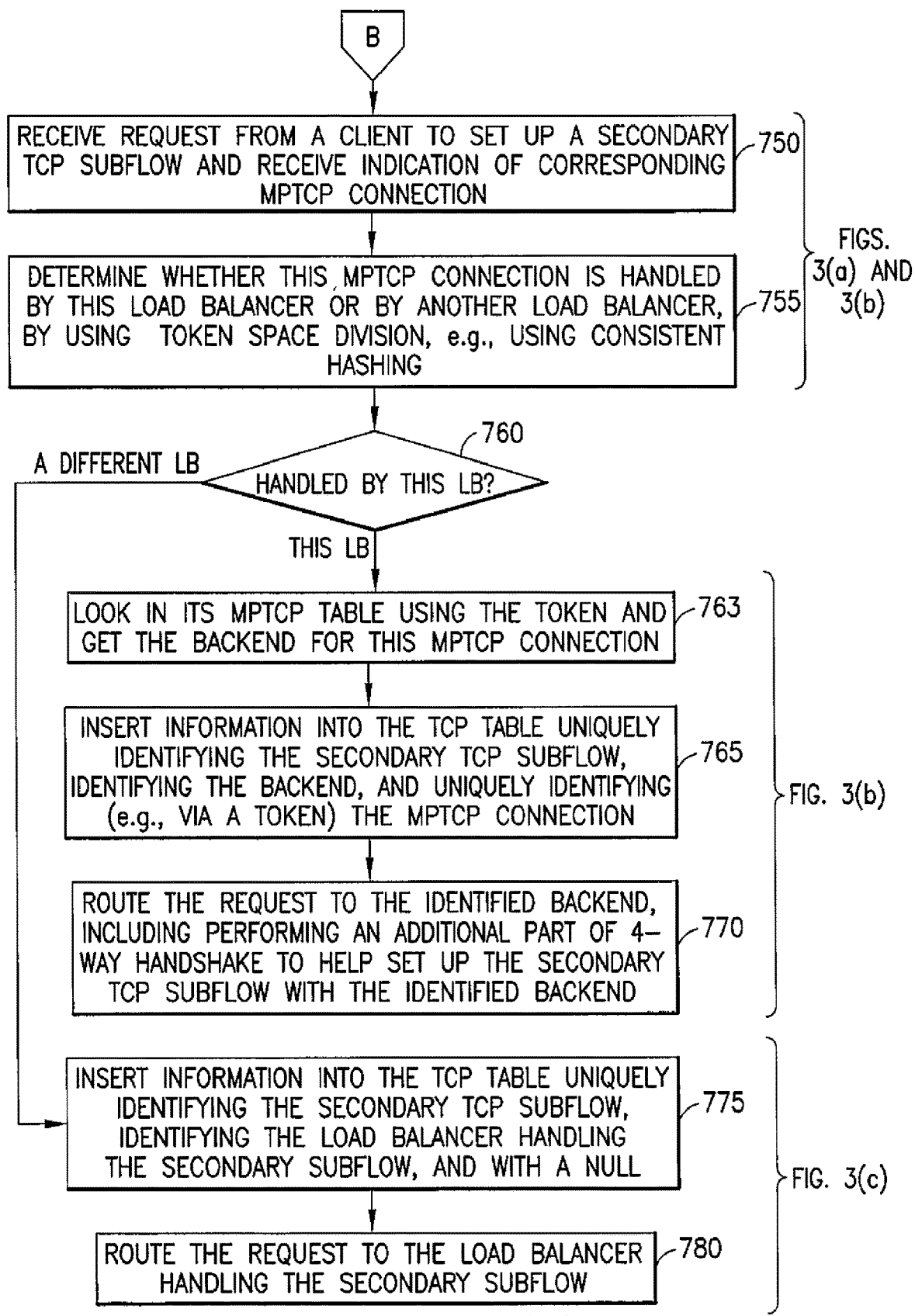

US 11,223,565 B2

DESIGNS OF AN MPTCP-AWARE LOAD BALANCER AND LOAD BALANCER USING THE DESIGNS

CROSS REFERENCE TO RELATED APPLICATION

This patent application is a U.S. National Stage application of International Patent Application Number PCT/US2017/068140 filed Dec. 22, 2017, which is hereby incorporated by reference in its entirety.

TECHNICAL FIELD

This invention relates generally to core networks in wireless networks such as mobile networks and, more specifically, relates to MultiPath Transmission Control Protocol (MPTCP) in core network.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, after the main part of the detailed description section.

With the proliferation of mobile applications, mobile data traffic continues to grow exponentially. According to a prediction from Cisco, by 2021, monthly global mobile data traffic will be four times of the current amount and reach 49 exabytes, which will represent 20 percent of total IP traffic. See Cisco, "Cisco Visual Networking Index: Global Mobile Data Traffic Forecast Update, 2016-2021 White Paper", March 2017. Although part of the reason is the growing number of devices, the major factor is still the amount of traffic generated per mobile device.

In order to support this exploding traffic demand, researchers have devoted significant effort in various directions. Two main directions are cellular techniques and WiFi (a technology for wireless local area networking with devices based on the IEEE 802.11 standards; Wi-Fi is a trademark of the Wi-Fi Alliance) techniques because today's mobile devices usually have both a cellular interface and a WiFi interface. New hot topics for cellular techniques include massive MIMO and millimeter wave; promising techniques that will be included in the next generation of WiFi consist of uplink MU-MIMO, OFDMA, and the like. On top of these two directions, there is actually one more important direction, i.e., the convergence of the cellular and WiFi networks. Although we are still far from unifying these two networks together, leveraging heterogeneous techniques, e.g., WiFi and cellular simultaneously instead of using one interface at a time is already possible.

One of the promising techniques that can leverage multiple interfaces of a mobile device simultaneously is the multipath TCP (MPTCP) protocol. Although this protocol was originally proposed in a data center environment, the MPTCP protocol is very suitable to boost the aggregated bandwidth of mobile devices with multiple radios. Previous work has shown that the MPTCP protocol can aggregate bandwidth of various interfaces working at different spectrum and provide massive capacity to mobile clients. See L. Hartung and M. Milind, "Policy driven multi-band spectrum aggregation for ultra-broadband wireless networks", in Dynamic Spectrum Access Networks (DySPAN), 2015 IEEE International Symposium on, pages 82-93, IEEE, 2015.

In addition to its good aggregation performance, another reason that makes MPTCP promising is that its design has the potential of wide adoption. In the TCP/IP stack, MPTCP sits on top of ordinary TCP protocol and below the socket interface to the application layer. Multipath-related signaling is all realized using a TCP option field, and each subflow of an MPTCP connection is just an ordinary TCP flow. When the middle boxes (e.g., the computer systems) between the client and the server do not support MPTCP, this protocol can fall back to ordinary TCP gracefully.

Nevertheless, currently the MPTCP protocol is still not widely deployed.

BRIEF SUMMARY

This section is intended to include examples and is not intended to be limiting.

In an exemplary embodiment, a method is disclosed that comprises routing, by a load balancer, multipath transmission control protocol (MPTCP) connections and their corresponding transmission control protocol (TCP) subflows toward one or more selected backends, wherein each MPTCP connection is routed to a single one of a plurality of backend and is able to comprise at least primary and secondary TCP subflows, and wherein routing the MPTCP connections comprises performing, in response to setting up a primary TCP subflow of an MPTCP connection, load balancing of the MPTCP connection to select a selected one of the plurality of backends for the MPTCP connection. The method also comprises tracking, by the load balancer, the MPTCP connections and their corresponding TCP subflows to enable routing of the MPTCP connections and their corresponding TCP subflows to the corresponding selected backends.

An additional example of an embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An example of an apparatus includes one or more processors and one or more memories including computer program code. The one or more memories and the computer program code are configured to, with the one or more processors, cause the apparatus to perform at least the following: routing, by a load balancer, multipath transmission control protocol (MPTCP) connections and their corresponding transmission control protocol (TCP) subflows toward one or more selected backends, wherein each MPTCP connection is routed to a single one of a plurality of backend and is able to comprise at least primary and secondary TCP subflows, and wherein routing the MPTCP connections comprises performing, in response to setting up a primary TCP subflow of an MPTCP connection, load balancing of the MPTCP connection to select a selected one of the plurality of backends for the MPTCP connection; and tracking, by the load balancer, the MPTCP connections and their corresponding TCP subflows to enable routing of the MPTCP connections and their corresponding TCP subflows to the corresponding selected backends.

An example of a computer program product includes a computer-readable storage medium bearing computer program code embodied therein for use with a computer. The computer program code includes: code for routing, by a load balancer, multipath transmission control protocol (MPTCP) connections and their corresponding transmission control protocol (TCP) subflows toward one or more selected backends, wherein each MPTCP connection is routed to a single one of a plurality of backend and is able to comprise at least primary and secondary TCP subflows, and wherein routing the MPTCP connections comprises performing, in response to setting up a primary TCP subflow of an MPTCP connection, load balancing of the MPTCP connection to select a selected one of the plurality of backends for the MPTCP connection; and code for tracking, by the load balancer, the MPTCP connections and their corresponding TCP subflows to enable routing of the MPTCP connections and their corresponding TCP subflows to the corresponding selected backends.

In another example of an embodiment, an apparatus comprises: means for routing, by a load balancer, multipath transmission control protocol (MPTCP) connections and their corresponding transmission control protocol (TCP) subflows toward one or more selected backends, wherein each MPTCP connection is routed to a single one of a plurality of backend and is able to comprise at least primary and secondary TCP sub flows, and wherein routing the MPTCP connections comprises performing, in response to setting up a primary TCP subflow of an MPTCP connection, load balancing of the MPTCP connection to select a selected one of the plurality of backends for the MPTCP connection; and means for tracking, by the load balancer, the MPTCP connections and their corresponding TCP sub flows to enable routing of the MPTCP connections and their corresponding TCP subflows to the corresponding selected backends.

In an example of an embodiment, a method is disclosed that includes, at a backend in a communication system, determining whether a request by a client to set up a primary transmission control protocol (TCP) subflow of a multipath TCP (MPTCP) connection already includes a key used to generate a token used to uniquely identify the MPTCP connection from other MPTCP connections. The method also includes generating by the backend the token based on the key from the request, and using by the backend the token to distinguish subsequent communications for the MPTCP connection.

An additional example of an embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An example of an apparatus includes one or more processors and one or more memories including computer program code. The one or more memories and the computer program code are configured to, with the one or more processors, cause the apparatus to perform at least the following: at a backend in a communication system, determining whether a request by a client to set up a primary transmission control protocol (TCP) subflow of a multipath TCP (MPTCP) connection already includes a key used to generate a token used to uniquely identify the MPTCP connection from other MPTCP connections; generating by the backend the token based on the key from the request; and using by the backend the token to distinguish subsequent communications for the MPTCP connection.

An example of a computer program product includes a computer-readable storage medium bearing computer program code embodied therein for use with a computer. The computer program code includes: code for at a backend in a communication system, determining whether a request by a client to set up a primary transmission control protocol (TCP) subflow of a multipath TCP (MPTCP) connection already includes a key used to generate a token used to uniquely identify the MPTCP connection from other MPTCP connections; code for generating by the backend the token based on the key from the request; and code for using by the backend the token to distinguish subsequent communications for the MPTCP connection.

In another example of an embodiment, an apparatus comprises: means, at a backend in a communication system, for determining whether a request by a client to set up a primary transmission control protocol (TCP) subflow of a multipath TCP (MPTCP) connection already includes a key used to generate a token used to uniquely identify the MPTCP connection from other MPTCP connections; means for generating by the backend the token based on the key from the request; and means for using by the backend the token to distinguish subsequent communications for the MPTCP connection.

BRIEF DESCRIPTION OF THE DRAWINGS

In the attached Drawing Figures:

FIG. 3, including FIG. 3(a) illustrates a primary flow setup, FIG. 3(b) illustrates a secondary flow setup if the secondary flow reaches a same load balancer, and FIG. 3(c) illustrates a secondary flow setup if the secondary flow reaches a different load balancer;

FIG. 5, split between FIGS. 5(a), 5(b), and 5(c), illustrates three types of threads using in exemplary embodiments to realize implementation and the connections between threads, physical port, and Kernel NIC interface (KNI), where FIG. 5(b) illustrates a passthrough thread, and FIG. 5(c) illustrates a forwarding thread;

FIG. 7, split into FIGS. 7(a) and 7(b), is a logic flow diagram performed by an exemplary load balancer to implement MPTCP awareness in an exemplary embodiment, and illustrates the operation of an exemplary method or methods, a result of execution of computer program instructions embodied on a computer readable memory, functions performed by logic implemented in hardware, and/or interconnected means for performing functions in accordance with exemplary embodiments.

DETAILED DESCRIPTION OF THE DRAWINGS

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

For ease of reference, this disclosure is divided into multiple sections.

1. Introduction

As described above, currently the MPTCP protocol is still not widely deployed. One reason is that the load balancers of service provider in its data center are not MPTCP-aware. State-of-the-art load balancer designs decide which backend a TCP subflow goes to independently, based on the 5-tuple of the flow, hence can forward the multiple TCP subflows of the same MPTCP connection to different backends.

The exemplary designs herein, by contrast, include MPTCP-aware load balancers. We aim at high performance in terms of number of processing packets per unit time and ease of deployment. With these two design principles in mind, we move the generation process of MPTCP connection identifier, e.g., key/token, to a load balancer, and extend the single connection tracking table in state-of-the-art load balancer designs to two connection tracking tables in exemplary embodiments: One table for ordinary TCP and the other table for MPTCP. These ensure that the load balancer can forward multiple TCP subflows of the same MPTCP connection to the same backend. When there are multiple load balancers, in an exemplary embodiment, the MPTCP token space is divided using consistent hashing to guarantee the uniqueness of token and also every load balancer can compute the result of token space division so that this load balancer knows any other load balancer's token range. We also forward packets between the load balancers when subflows reach different load balancers so that global state synchronization is avoided.

One exemplary contribution herein is to proposal of a high performance and easily deployable MPTCP-aware load balancer design. We also identify some unique implementation challenges specific to an MPTCP-aware load balancer.

The rest of this disclosure is organized as follows. In Section 2, we describe additional background information of load balancing in today's data center and MPTCP connection setup process. We present exemplary MPTCP-aware load balancer designs in Section 3 and possible implementation examples in Section 4. Some concluding comments are in Section 5.

2. Additional Background

This section provides additional background helpful in explaining the exemplary embodiments.

2.1 Load Balancing in Data Centers

Figure 1:
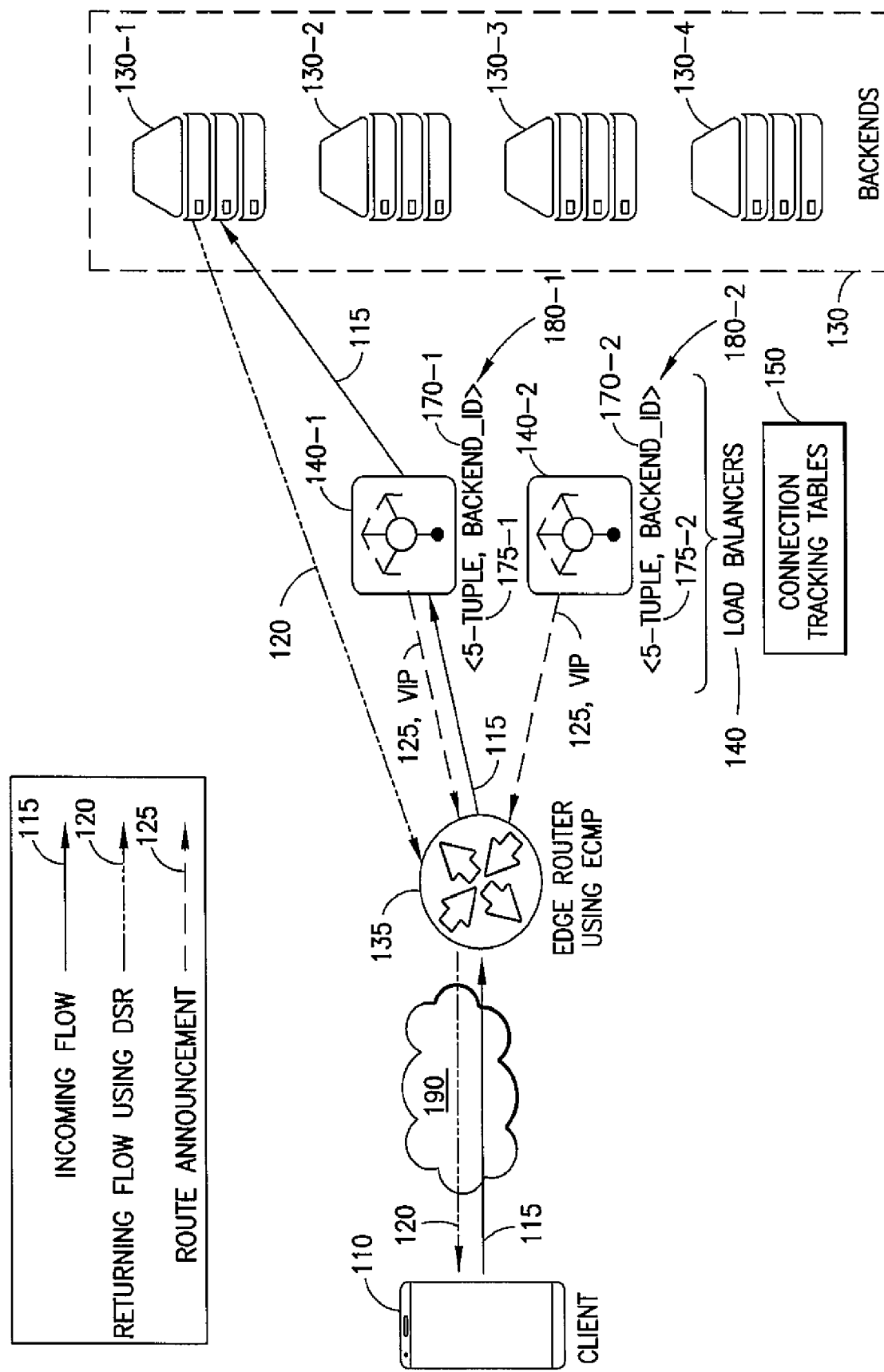
FIG. 1 illustrates a typical scenario of load balancing in today's data center.

FIG. 1 illustrates a typical scenario of load balancing in today's data center. An edge router 135 uses Equal Cost Multi Path (ECMP) to distribute flows evenly across load balancers 140, of which two load balancers 140-1 and 140-2 are shown. Load balancers 140 use consistent hashing and connection tracking tables 150 to determine the backend 130 to which a flow is routed. A backend 130 is a server that provides some type of a service to the client 110, such as providing video, applications, or other services. There are four backends 130-1, 130-2, 130-3, and 130-4 illustrated. The client is a user equipment 110. The user equipment 110 communicates through a network such as the Internet with the edge router 135. The incoming flow 115 passes through the edge router 135 and, in this example, to the load balancer 140-1 and to the backend 130-1. Returning flow 120 directly goes to the edge router 135 without passing through the load balancers 140. Route announcement 125 is sent (e.g., using a virtual IP, VIP) from the two load balancers 140-1, 140-2 to the edge router 135.

A service provider usually has only one public IP address (per data center) known by clients through DNS, which is also called the virtual IP (VIP) of the service. However, in order to achieve high availability, a large group of backends 130 serve the incoming flows 115 simultaneously. Thus, load balancers 140 are configured between the edge router 135 and the backend pool. Each load balancer 140 announces (reference 125) a route to the VIP with the same cost to the edge router 135 so that incoming flows 115 to this VIP are evenly distributed across all load balancers 135 using ECMP. The load balancers then decide which backend an incoming flow 115 goes to and forward the packets to the decided backend 130. For a new incoming flow 115, identified by the 5-tuple 175, a load balancer usually uses consistent hashing on the 5-tuple to decide which backend the packets are forwarded to and adds an entry to its connection tracking table 150. In the case of following packets of known flows, the packets are forwarded based on the information in the connection tracking table. For instance, the load balancer 140-1 has a connection tracking table 180-1 comprising a single exemplary entry, <5-tuple 175-1, backend_id 170-1>, which illustrates routing incoming flow 115 to the load balancer 140-1 for routing to the backend 130-1 (with backend_id 170-1). The load balancer 140-2 has a connection tracking table 180-2 comprising a single exemplary entry, <5-tuple 175-2, backend_id 170-2>, which illustrates another possibility for routing another incoming flow 115 to the load balancer 140-2 for routing to a backend 130 with backend_id 170-2, although no flow is shown routed through the load balancer 140-2. For the returning traffic, state-of-the-art designs usually support direct server return (DSR), i.e. the returning traffic directly goes to the edge router 135 without passing through load balancers 140, which makes serving a very large number of flows possible. See the returning flows 120. In this case, we can consider load balancers as layer 4 routers, which do not split the layer 4 connections.

2.2 MPTCP Connection Setup

MPTCP is an extension of the TCP protocol using TCP option standardized in RFC6824. See A. Ford, C. Raiciu, M. J. Handley, and O. Bonaventure, "TCP Extensions for Multipath Operation with Multiple Addresses", RFC 6824, January 2013. A MPTCP connection usually contains several subflows, each of which is an ordinary TCP flow. Thus, MPTCP is a layer 4 protocol that sits on top of TCP protocol and below the application layer.

Figure 2:
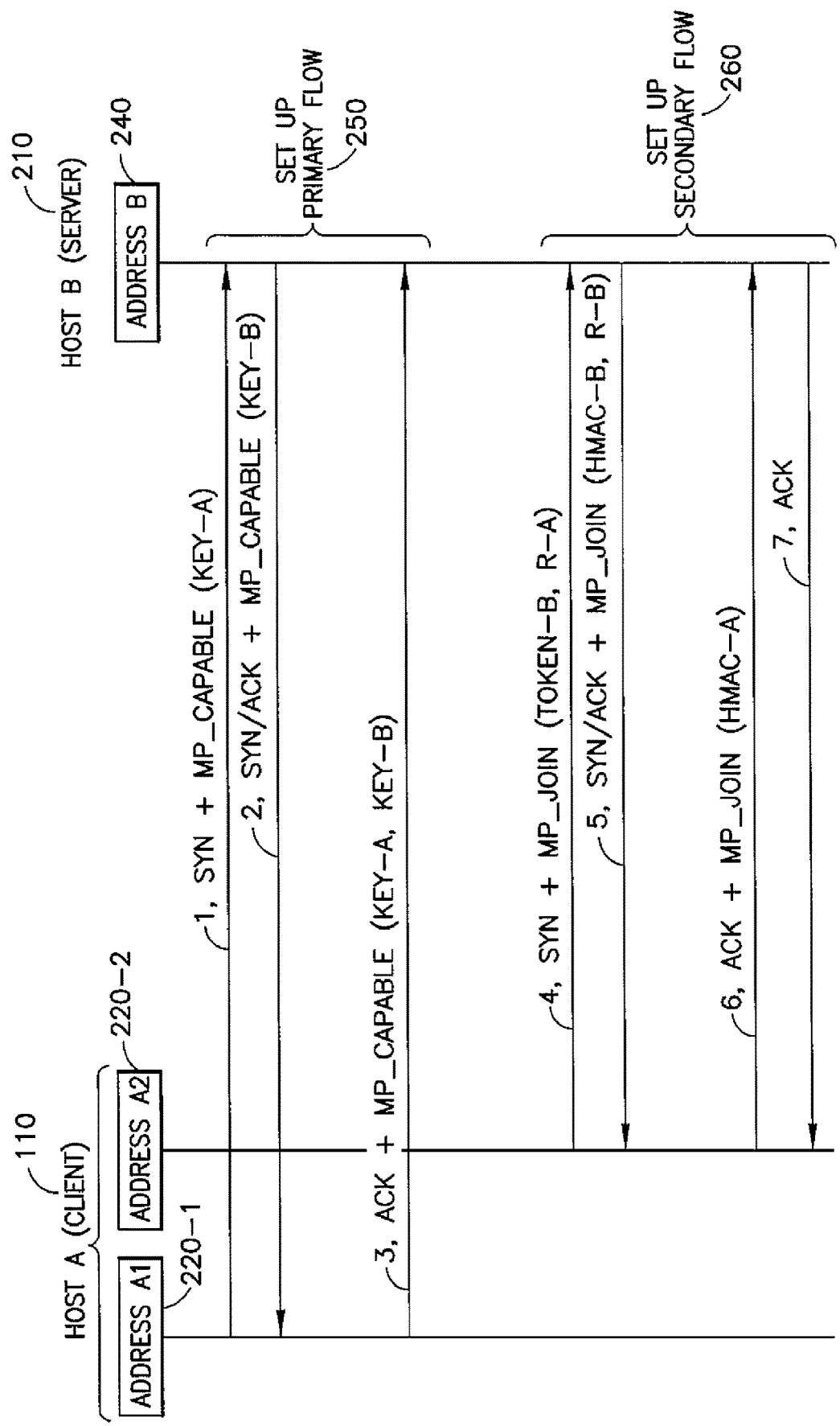
FIG. 2 illustrates an MPTCP connection setup process.

FIG. 2 shows the process to successfully set up a MPTCP connection between a client/Host A 110 and a server/Host B 210 with multiple TCP subflows. The server/Host B 210 may be thought of as a backend 130, for ease of exposition, and the edge router 135 and load balancers 140 are not shown. As described below, a 3-way handshake is used to set up the primary flow (see reference 250) and exchange the 64-bit keys. A 4-way handshake is used to finish the authentication process to add the secondary flow (see reference 260). Token-B=SHA-1 (Key-B) is unique at the server side (having Address B 240) to identify an MPTCP connection. HMAC-A=HMAC (Key=Key-A+Key-B, Msg=R–A+R–B), HMAC-B=HMAC (Key=Key-B+Key-A, Msg=R–B+R–A). R-A and R—B are random nonces.

The primary flow is established first via a 3-way handshake with an MP_CAPABLE option, during which 64-bit keys of both sides are exchanged. The 3-way handshake is the following: Step 1, SYN+MP_CAPABLE (KEY-A) (e.g., indicating the client 110 wants to set up a TCP flow and supports MPTCP, and indicating the key, KEY-A, to be used on the client side to create a token); Step 2, SYN/ACK+MP-CAPABLE (KEY-B) (e.g., indicating the server 210 is ready to set up an MPTCP connection and indicating the key to be used on the backend side to create a token with which the TCP flows should be associated); and Step 3, ACK+MP_CAPABLE (KEY-A, KEY-B). Note these are for Address A1 220-1 of the Host A/client 110, and the Host B/server has an address of Address B 240. Then, in order to add a secondary flow to this MITCP connection, the client 110 sends (see Step 4) a SYN MP_JOIN packet with token-B. Token-B is the most significant 32 bits of an SHA1 hash on key-B and it uniquely identifies this MPTCP connection on the server side. There are three more packets afterwards to finish the authentication process to establish the secondary flow. Particularly, the following are communicated: Step 5, SYN/ACK+MP (HMAC-B, R-B); Step 6, ACK+MP_JOIN (HMAC-A); and Step 7, ACK+MP_JOIN (HMAC-A).

In the context of the data center, all TCP subflows of the same MPTCP connection need to go to the same backend in order to fully take advantage of MPTCP. However, it is apparent that this requirement cannot be guaranteed in the load balancer design in Section 2.1.

3. MPTCP-Aware Load Balancer Design Examples

In this section, we present exemplary designs of an MPTCP-aware load balancer. We start with our design principles, assumptions, and constraints. Next, we consider a simple case where we have only one load balancer, and then extend the design to the case where we have multiple load balancers. Finally, we address some special packets and summarize the pros and cons of our design.

3.1 Principles, Assumptions, and Constraints

Design principles: In exemplary designs, we aim at high packet processing speed and ease of deployment.

Design assumptions: We assume that the client has multiple interfaces/IP addresses and that the service provider has only one VIP address and port number per service known to the client.

Constraints: Based on these design principles and assumptions, we have the following constraints on the design space. Our design cannot modify the traditional TCP protocol and can only make minimal modification on the MPTCP protocol. There is no constraint, however, on the client's configuration, but only minimal modification on the service provider's network configurations is possible. We also need to support DSR and multiple load balancers. Finally, only a small disruption is tolerable when a backend or a load balancer goes up or down.

3.2 The Case of Only One Load Balancer

We present an exemplary design by addressing the following three questions. Without losing the generality of our design, we only consider (MP)TCP traffic hereafter.

1) Who generates the key-B/token-B? Without considering the load balancer, the backend generates key-B/token-B. Nevertheless, since the token is used to identify an MPTCP connection, it is easier to guarantee its uniqueness at the load balancer given the fact that the number of backends is usually large. Moreover, in DSR, the SYN/ACK with key-B cannot be seen by the load balancer if the backend generates it, which can introduce significant overhead. Specifically, mechanisms will be required to ensure the load-balancer receives/extracts the key-B consistently for all MPTCP sessions during normal operations as well as in the event of failures. For this reason, we move the key/token generation function to the load balancer. One exemplary advantage of this method is it does not introduce any new option fields such as MPTCP option fields.

2) How to inform the backend of the selected key-B? Recall that the third packet in the 3-way handshake to setup the primary flow is an ACK MP_CAPABLE packet with both key-A and key-B. We therefore decide to piggyback the key-B selected by the load balancer into the MP_CAPABLE option field similar to the ACK MP_CAPABLE packet. As stated previously, this method does not introduce any new MPTCP option fields. Note that this method requires a small modification to the MPTCP server side code to extract a key-B and the load balancer needs to re-compute the TCP header checksum.

3) How to ensure secondary subflow goes to the same backend? In an exemplary embodiment, we maintain two connection tracking tables, one for the ordinary TCP connection and the other for the MPTCP connection. The ordinary TCP connection tracking table is defined as <5-tuple, (backend_id, token-B)> and the MPTCP connection tracking table is defined as <token-B, (backend_id, key-B)>. When the primary flow arrives, we allocate a unique key/token and decide which backend the primary flow goes to using consistent hashing on the 5-tuple of the primary flow. In an exemplary embodiment, we add one entry to each table to record the necessary information. Then, when the secondary flow arrives, we look up the MPTCP connection tracking table using the token in the SYN MP_JOIN packet to find the backend the secondary flow goes to, and add an entry to the ordinary TCP connection tracking table to record this decision.

Figure 3A:
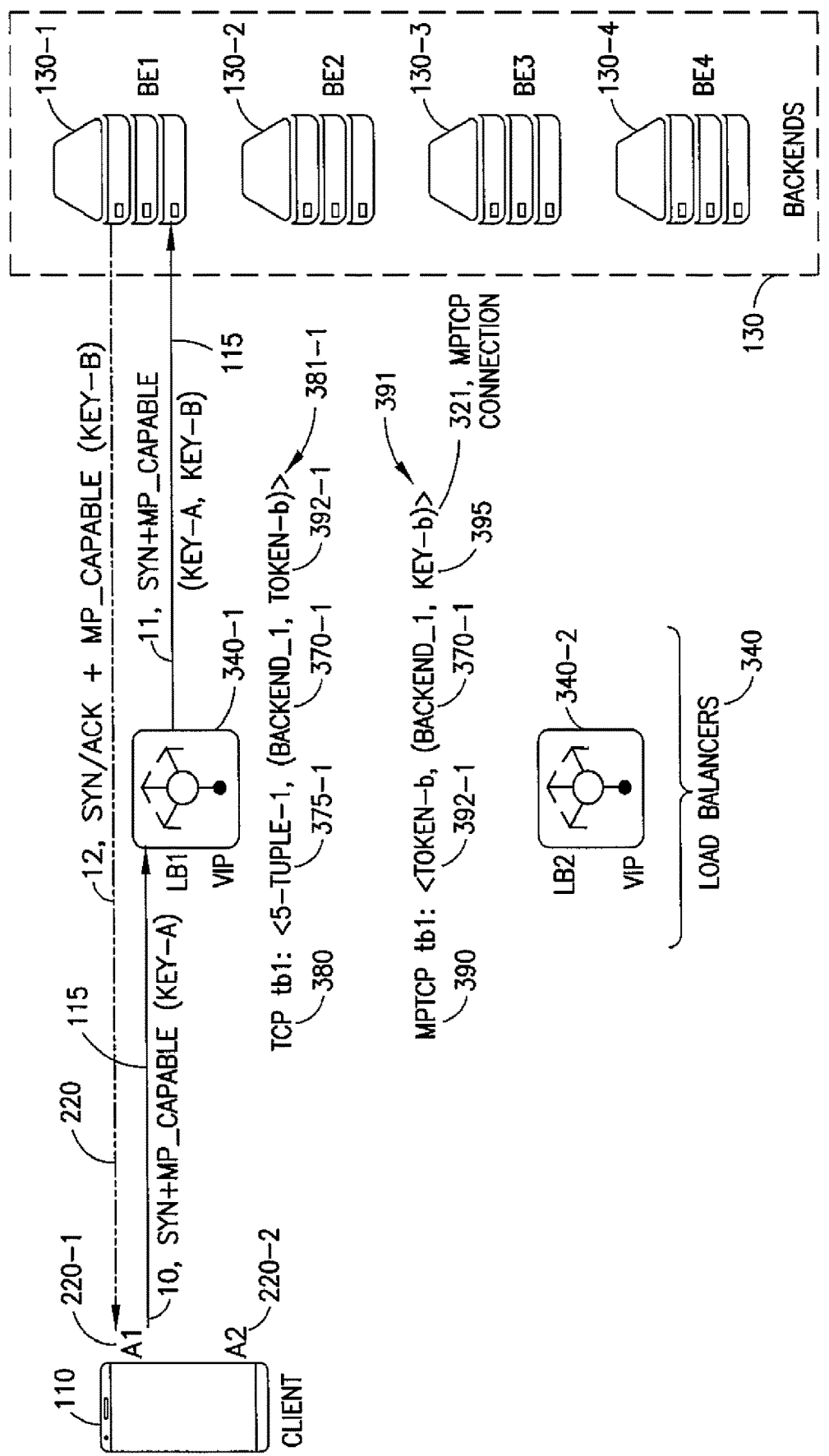
FIGS. 3(a), 3(b), and 3(c), illustrates MPTCP connection setup processes through the load balancers, where only the initial two-packet exchange (see FIG. 1) in each subflow is shown.
Figure 3B:
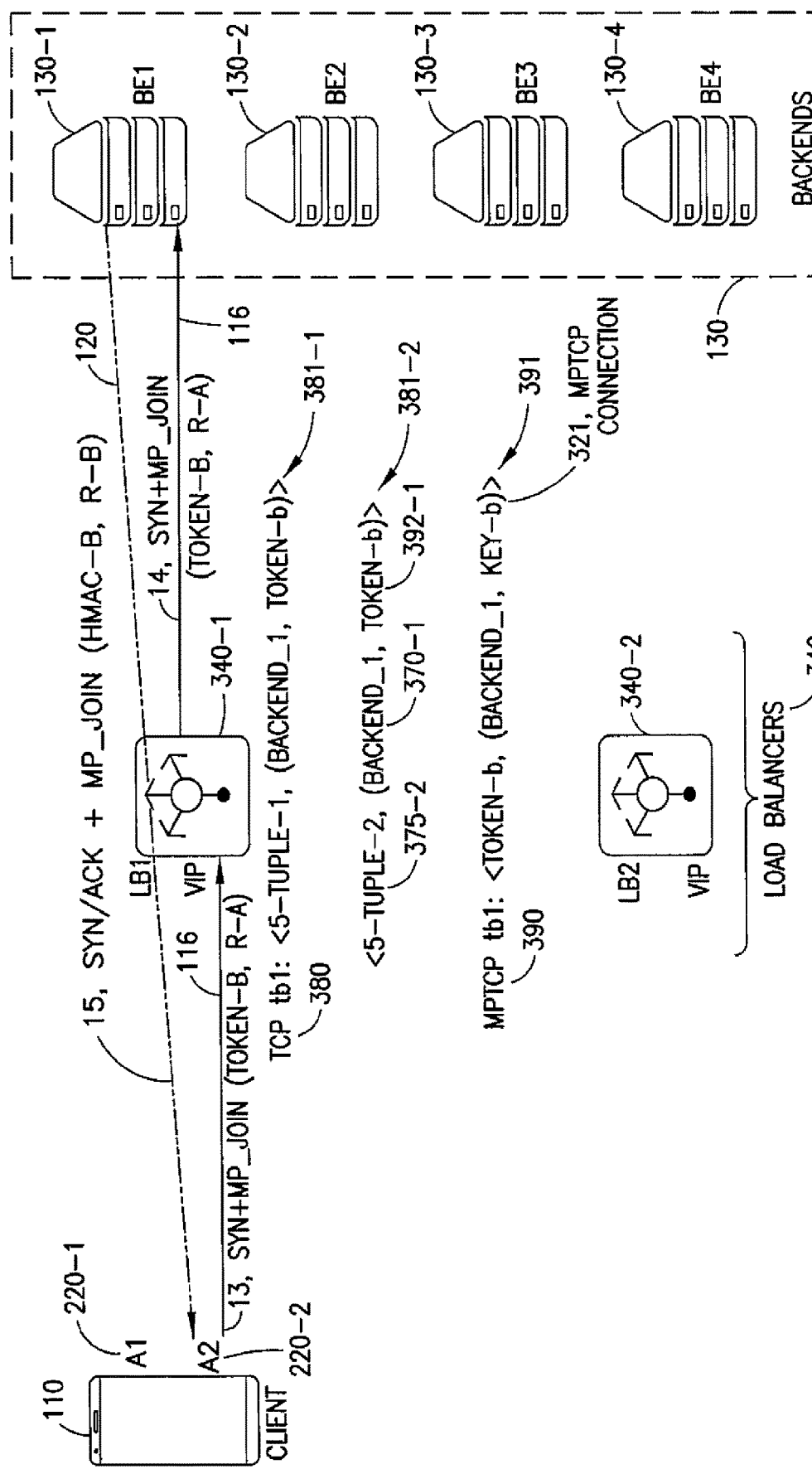
Figure 3C:
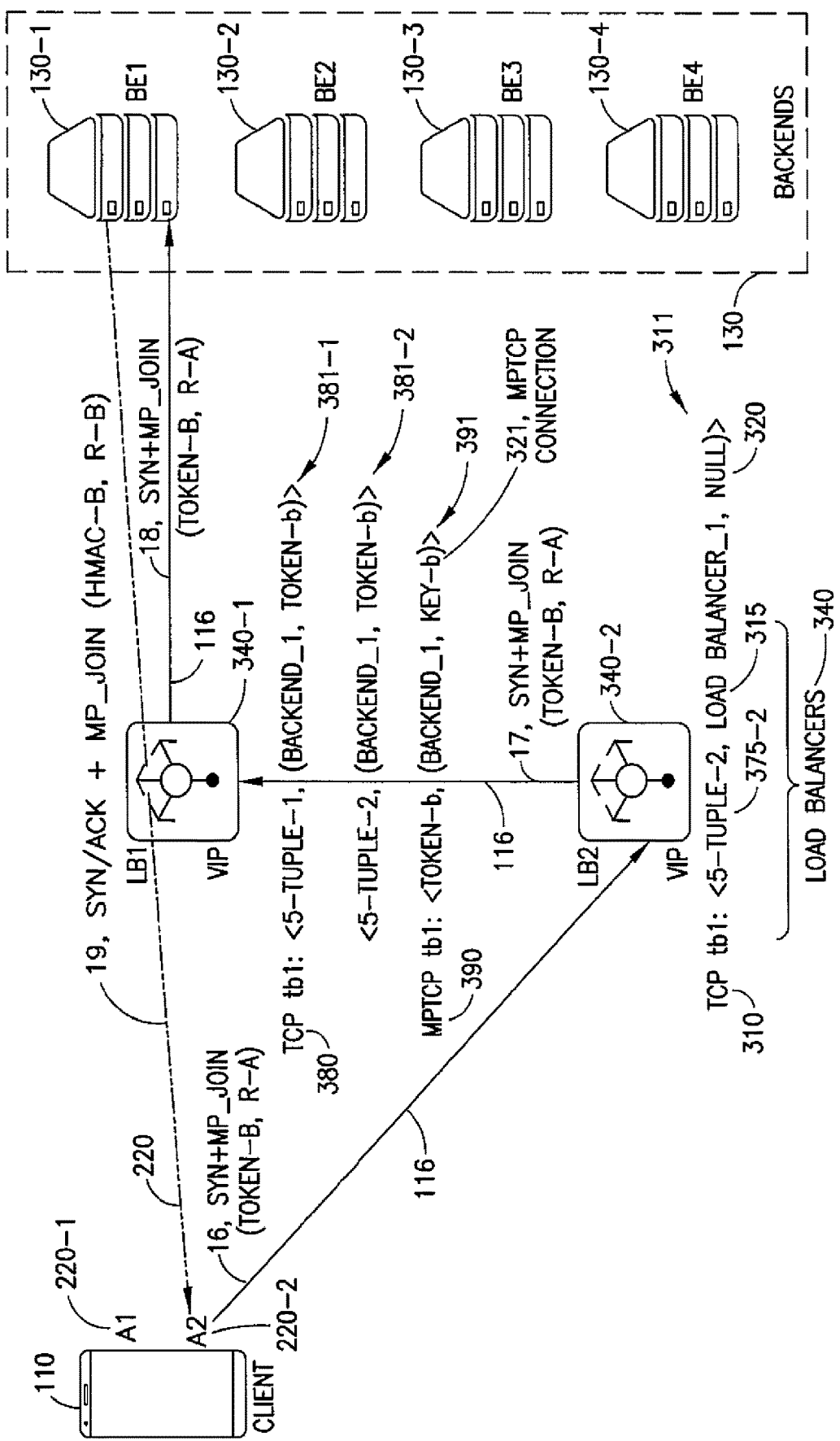

FIG. 3, including FIG. 3(a), FIG. 3(b), and FIG. 3(c), illustrates exemplary processes for MPTCP set up, routing, and tracking. FIG. 3(a) illustrates a primary flow setup, FIG. 3(b) illustrates a secondary flow setup if the secondary flow reaches a same load balancer. FIG. 3(c) is described below in reference to the case of multiple load balancers. In these figures, the load balancers 340 are load balancers 340-1 and 340-2, and the edge router 135 is not shown for simplicity but is expected to be inmost systems. In FIG. 3(a), the client 110 sends (step 10) a SYN MP_CAPABLE (KEY-A) packet, as a request for set up of an incoming flow 115, to the load balancer 340-1. In response, the load balancer 340-1 creates a TCP table (tbl) 380 having a single entry 381-1 corresponding to the primary flow 115, comprising a 5-tuple-1 375-1 (e.g., uniquely identifying this TCP subflow), an ID 370-1 of the backend 130-1 (backend_1 370-1), and a token-b 392-1. The load balancer 340-1 also creates an MPTCP table 390 having a single entry 391, comprising the token-b 392-1, the ID 370-1 of the backend 130-1 (backend_1 370-1), and a key-b 391. The entry 391 corresponds to the MPTCP connection 321, which at this point comprises only the subflow 115 (corresponding to the entry 381-1). The load balancer 340-1 sends as part of the incoming flow 115 in Step 11 a packet of SYN+MP_CAPABLE (KEY-A, KEY-B) to the backend 130-1. The backend 130-1 sends in Step 12 a returning flow (e.g., using DSR) 120 directly to the client 110.

For FIG. 3(b), this figure illustrates a secondary flow setup if the secondary flow request reaches a same load balancer. In this example a secondary flow 116 originates from Address A1 220-2, and the client sends (Step 13) a SYN+MP_JOIN (Token-B, R-A) packet (a request for set up of the secondary subflow) to the load balancer 340-1, which sends in step 14 a SYN+MP_JOIN (Token-B, R-A) packet to the backend 130-1 with the subflow 116. Responsive to this packet, the load balancer 340 creates the entry 381-2 in the TCP table 380, comprising a 5-tuple-2 375-2 (e.g., uniquely identifying this TCP subflow), the backend_1 ID 370-1, and the token-b 392-1. The backend 130-1 responds to the client 110 in Step 15 using the SYN/ACK+MP_JOIN (HMAC-B, R-B) packet. The MPTCP connection 321 comprises the subflow 115 (corresponding to the entry 381-1) and the subflow 116 (corresponding to the entry 381-2).

For the following packets of primary flow 115 or secondary flow 116, that is after the initial primary flow 115 or secondary flow 116 is set up, the load balancer 140-1 looks up the ordinary TCP connection tracking table 380 to get the backend_id 370-1 and the token-b 392-1, then looks up the MPTCP connection tracking table 390 using the token 392-1 only for the purpose of updating the last used time of this entry. Examples using a time to perform this updating are described below.

3.3 The Case of Multiple Load Balancers

The exemplary design for the single load balancer may be extended to support multiple load balancers. The case of multiple load balancers is illustrated in one example in FIG. 3(c). That is, FIG. 3 also includes FIG. 3(c), which illustrates a secondary flow setup if the secondary flow reaches a different load balancer. In this case, the secondary flow 116 corresponds to the Address A2 of the client 110, and the client 110 sends the SYN+MP_JOIN (Token-B, R-A) to the load balancer 340-2. The load balancer 340-2 then creates the TCP table 310, with the single entry 311, comprising a 5-tuple-2 275-2, an ID 315 (e.g., a MAC address or IP address) of the load balancer 340-1, loadbalancer_1 315, and a null 320 entry.

Similarly to the above presentation, this design is presented by addressing three questions.

1) Does a load balancer need to know the key/token generated by others? If the allocated key/token information is available to all load balancers, the process of generating a unique new key/token is very simple. For instance, one can simply randomly generate the key and check whether its corresponding token is in the MPTCP connection tracking table, e.g., table 390 in FIG. 3. However, making allocated key/token information available to all load balancer may be in fact very costly because it needs global synchronization. Experience from previous work has shown that global synchronization should be avoided. See the following: P. Patel, et al., "Ananta: Cloud scale load balancing", in *ACM SIGCOMM Computer Communication Review*, volume 43, pages 207-218. ACM, 2013; and D. E. Eisenbud, et al., "Maglev: A fast and reliable software network load balancer, In NSDI, pages 523-535, 2016. Thus, a load balancer does not know which key/tokens are allocated by others in our design (although a load balance will know ranges of tokens assigned to—but not allocated by—other load balancers), in an exemplary embodiment.

2) How to ensure the generated key/token is unique among multiple load balancers? Without knowing the allocated key/tokens of others, we can still guarantee in an exemplary embodiment the uniqueness by dividing the token space into non-overlapping subspaces and each load balancer can only generate a key whose corresponding token falls into its own subspace. In order to have minimal disruption when a load balancer goes up or down, we may still apply the idea of consistent hashing to divide the token space. For example, we can use a hash function on the IP addresses of the load balancers 340 to map them onto the token space and require each one can only generate a token falling into its right-hand side.

Figure 4:
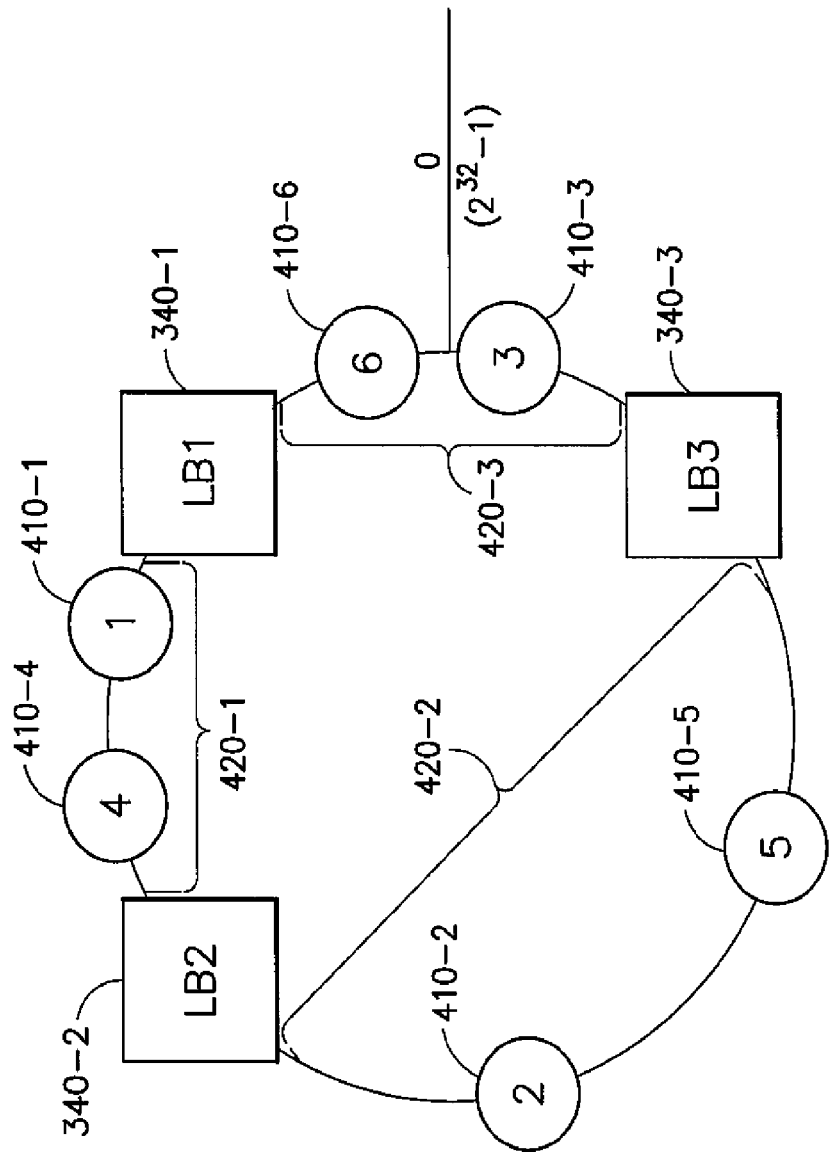
FIG. 4 illustrates an example of token space division using consistent hashing.

FIG. 4 illustrates this idea, and illustrates an example of token space division using consistent hashing. This example has three load balancers (LB) 340: LB1 340-1; LB2 340-2; and LB3 340-3. Each load balancer 340 can only generate a key whose corresponding token falls into its own subspace, for example the right-hand side to each LB in this figure. Note that the load balancers 340 need to regenerate the key if the key does not meet the requirement and the average number of tries to generate a valid key is roughly equal to the number of load balancers.

More specifically, FIG. 4 shows division of space of tokens (e.g., 32 bits of SHA_1 hash of keyKey-B in FIG. 2) among multiple load balancers 340. Since, the token can be only 32 bits in this example, hence $(2^{32}-1)$ is the maximum value and so 0 to $(2^32-1)$ indicates the MPTCP token number space. When you have multiple load balancers, the token space needs to be divided among those where each LB 340 handles only a subset of the tokens.

Here is one example way. Assume load balancers $LB_1$, $LB_2 \ldots LB_n$ have IP addresses $IP_1, IP_2, \ldots, IP_n$. Hash these addresses to values $key_1, key_2, key_3, \ldots, key_n$ on the RANGE R=(0 to $(2^{32}-1)$). So $LB_i$ has address $IP_i$. Hash_32 $(IP_i)$=$key_i$. The $key_i$ is mapped to the circle. Now the subrange of range R assigned to $LB_i$ is as follows: If you stand on the key, looking to the center of the circle, all values to the RIGHT of the observer and until its nearest neighbor on the right hand side are assigned to the load balancer corresponding to $key_i$.

In the example shown in FIG. 4, each LB 340 will get a continuous subrange. With this scheme, the continuous subrange assigned to each LB is not of same length and can be uneven. For instance, the $LB_1$ 340-1 has subrange 420-1 and has generated actual token values represented by positions 1 410-1 and 4 410-4, $LB_2$ 340-2 has subrange 420-2 and has generated actual token values represented by positions 2 410-2 and 5 410-5, and $LB_3$ 340-3 has subrange 420-3 and has generated actual token values represented by positions 3 410-3 and 6 410-6. There are other consistent hashing schemes that can make the ranges even and also if desired non-continuous.

Also, note that in FIG. 4, the positions 410 of the circles on the entire token space represent the actual token values. The numbers 1-6 (410-1 through 410-6) in the circle show the order of generated tokens from the global view.

3) How to ensure subflows reaching different load balancers go to the same backend? Suppose the primary flow is established as shown in FIG. 3(*a*). Then, load balancer 1 340-1 knows which backend this MPTCP connection (primary subflow 115) goes to and token-b 392-1 is within the token subspace of load balancer 1. If the secondary subflow 116 goes to load balancer 2 as shown in FIG. 3(*c*), load balancer 2 340-2 does not know which backend this MPTCP connection goes to, based on this token-b 392-1, but the load balancer 2 340-2 knows that load balancer 1340-1 is responsible for this token-b 392-1 (e.g., by using the techniques described above with respect to FIG. 4). Thus, load balancer 2 340-2 forwards this secondary flow 116 to load balancer 1 and load balancer 1340-1 can forward the flow to the correct backend (in this example, 130-1). Load balancer 2 340-2 also adds an entry 391 <5-tuple-2, (loadblancer_1, null)> to its ordinary TCP connection tracking table 390 to record this decision. Note that "null" represents an invalid token and load balancers can be considered as a special group of backends. That is, backends are a group of servers dedicated to the same service. Consider load balancing as a service, and therefore load balancers are the "backends" of this service.

3.4 Special Packets that Need Attention

This section describes certain packets that may need special attention.

Regarding duplicate SYN MP_CAPABLE packets, it is possible to receive duplicate SYN MP_CAPABLE packets from the same client. In this case, we should not allocate a new key/token. Instead, we should use the same key allocated previously. This is one reason that we keep the key-b field 395 in the MPTCP connection tracking table 390.

For a SYN MP_JOIN with an invalid token, in RFC6824 (see A. Ford, et al., "TCP Extensions for Multipath Operation with Multiple Addresses", RFC 6824, January 2013), if a server receives a SYN MP_JOIN packet with an invalid token, the server sends an RST packet back to the client. However, if a load balancer receives a SYN MP_JOIN packet whose token is within its token subspace but is not found in the MPTCP connection tracking table 390, we decide to silently drop this packet to decrease the burden on the load balancer.

With respect to ordinary SYN packets, it is possible to receive an ordinary SYN packet from a client 110 who has tried to set up an MPTCP connection previously. In this case, there is still an entry in each one of the connection tracking tables 380/390 with a valid token 390. Thus, we should retrieve this token 392, revise the token field of the entry in the TCP connection tracking table to "null" and remove the entry 391 in the MPTCP connection tracking table 390.

Regarding FIN, RST, MP_FASTCLOSE, MP_FAIL packets, FIN, RST, MP_FASTCLOSE packets mark the end of a (MP)TCP connection, and MP_FAIL packets represent the failure of setting up an MPTCP connection and the client 110 reverts to the ordinary TCP protocol. It is possible to use different mechanisms to deal with these packets at the load balancer 340 to remove outdated entries in the two connection tracking tables 380/390. However, in an exemplary embodiment, these packets are not treated differently because we might not be able to guarantee the transmission from the load balancer 340 to the backend 130 would be reliable. Instead, in an exemplary embodiment, we use a timer to timeout the entries in the two connection tracking tables 380, 390. As an example, a timer could be set upon entry of an item into the table. The timer would be reset each time the item is accessed. Specific instructions to close the item in the table cause cessation of use of the timer. On the other hand, if the timer times out (e.g., expires) without such instructions, this means that the item(s) corresponding to an MPTCP connection and its corresponding TCP subflows could be removed from the table(s).

For a Non-SYN packet with a 5-tuple not seen before, this can happen when the TCP connection tracking table 380 becomes full, or when a load balancer 340 goes up or down and ECMP is not realized using consistent hashing on a per connection basis, which results in a major traffic shuffle. Since we are using consistent hashing on 5-tuples to assign the backend 130, this ensures that the primary flows 115 will still have a high probability of finding the right backend. Nevertheless, we advocate reserving enough space for connection tables 380/390 and using consistent hashing on a per connection basis to realize ECMP at the edge router 135.

With respect to ACK MP_CAPABLE and ACK MP_JOIN from a 5-tuple seen before, in an ordinary TCP flow 3-way handshake, the connection is considered established if the server receives the ACK packet. However, as shown in FIG. 2, it is not safe to assume that the MPTCP connection is properly established if the server receives ACK MP_CAPABLE or ACK MP_JOIN without parsing the option field carefully. In particular, for ACK MP_JOIN, it can be that case that the HMAC-A received from the client does not match the expected HMAC-A, probably because the client is a malicious one or the middle box (e.g., a device between a client and a server) rewrites the packets. In both cases, the MPTCP connection is not successfully established due to this authentication failure and the failover process to ordinary TCP will start in step 7 of FIG. 2. Similarly, for ACK MP_CAPABLE, it can be the case that the Key-A received in step 1 doesn't match the Key-A received in step 3 or the Key-B received in step 3 doesn't match the Key-B generated by the load balancer. Thus, if one wants to use separated tables for trusted and untrusted flows similar to "Ananta: Cloud scale load balancing", in *ACM SIGCOMM Computer Communication Review*, cited previously, these two kinds of packets need special attention.

3.5 Advantages, Technical Effects, and Other Considerations

Without in any way limiting the scope, interpretation, or application of the claims appearing below, some exemplary advantages and technical effects of the exemplary embodiments include one or more of the following. It is believed exemplary designs can achieve high packet processing speed, e.g., because there is no state information that needs to be tightly synchronized among all load balancers or backends. In addition, since consistent hashing may be used to divide the token space into non-overlapping subspaces, there can be only small disruptions when a load balancer goes up or down. Moreover, because consistent hashing may be used on the 5-tuple for the primary flow 115 to decide to which backend 130 a MPTCP connection goes, the load balancer 340 can still find the correct backend 130 with high probability for the primary flow 115 even if there is a major traffic shuffle. Additionally, this design does not introduce any new IP option, TCP option, or MPTCP sub-option.

Other considerations are as follows. Certain exemplary designs are stateful and use two connection tracking tables. Thus, we have to reserve more memory on the load balancers for two tables instead of one in these exemplary embodiments. However, in case of software implementations of our load balancer, we do not envision need for memory to be a major cost or complexity concern and the resulting advantages (e.g.: lack of global synchronization) far outweigh the extra memory needs. Furthermore, when there are multiple load balancers, one may need to try several times in order to get a valid new key/token, which is computationally intensive. Although generating a key/token can be computationally intensive and redirecting packets between load balancers introduces additional delay, it is still far less than the delay introduced using a global synchronization mechanism. Moreover, when there is a major traffic shuffle, secondary flows 116 may not find the correct backend with high probability. However, with a correct ECMP implementation, there should be no major traffic shuffle. Lastly, since we are redirecting the secondary flow 116 between load balancers if the flow reaches a different load balancer from the primary flow, we add additional delay to the secondary flow. However, we contend that the resulting delay is marginal, as the delay represents additional forwarding hop in traditional IP routing.

4. Possible Implementation Examples

Additional considerations with respect to implementation and some examples of implementations are described in this section.

4.1 Additional Considerations and Implementation Aspects

The following are considerations that have either not clearly stated in previous work or are specific to these exemplary MPTCP-aware load balancer designs.

Regarding kernel versus kernel bypass, previous work has shown that using kernel bypass can significantly improve the performance of a load balancer over using a Linux kernel instead, in terms of the number of packets it can process per unit time. See D. E. Eisenbud, et al., "Maglev: A fast and reliable software network load balancer, In NSDI, pages 523-535, 2016. Kernel bypass processes layer 2 packets at the user space and communicates with the driver of the Ethernet interface without going through the kernel. Thus, one possible implementation could use an open source kernel bypass platform called Data Plane Development Kit (DPDK) offered by Intel and other companies. See the data plane development kit, at www.dpdk.org/. However, there may be an additional need to utilize the kernel to handle some control plane traffic, for example VIP route announcement. Another example is the case where not all load balancers and backends are in the same intranet. This might require us to implement layer 3 forwarding rather than layer 2 forwarding. In this case, load balancers also manage both a routing table and an ARP table, which can result in head-of-line blocking if these functions are realized through kernel bypass only. Fortunately, DPDK offers a kernel NIC interface to send the layer 2 packets from the user space back to the kernel.

Concerning connection tracking table entry expiration, an ordinary load balancer design does not require entries in the connection tracking table to expire in a timely manner because this has almost no negative effect if the table becomes full. Thus, the connection tracking table can be realized through a least recently used (LRU) hash table. In a LRU hash table, there are a fixed number of buckets and each bucket can support a fixed number of keys. When a key is looked up or a new key is added, the entries in this bucket are reordered so that the order reflects which entry has been recently used. Thus, an entry will be removed only when a new key is added to the same bucket, which has reached its maximum number of keys, and this entry is the least recently used. However, an LRU hash table may not be able to support a MPTCP connection tracking table. Suppose the MPTCP connection tracking table is large enough, and all keys in a load balancer's subspace can be allocated without retrieval after running for a sufficient length of time. This means the table can no longer support a new MPTCP connection. Thus, an extendable hash table may be used instead with timely entry timeout support. For instance, if an entry in the table is not looked up for a given amount of time, we will mark this entry invalid (e.g., expired). Note that although we use timely entry expiration support, the frequency of calling table entry expiration function is in fact significantly less than the frequency of table lookup.

For priority of table entries when dealing with a mixture of traffic, in the non-MPTCP-aware load balancer design, connection tracking table entries have roughly the same priority. Even if the table becomes full, consistent hashing on the 5-tuple guarantees that a load balancer can still find the right backend with high probability. However, in an exemplary MPTCP-aware load balancer design, we believe that MPTCP related entries have higher priority even in the ordinary TCP connection tracking table when dealing with a mixture of ordinary TCP and MPTCP traffic and even other types of traffic, e.g. UDP, SCTP. For example, if the ordinary TCP connection tracking table 380 becomes full, when a new MPTCP primary flow arrives, it is possible to allocate a new key/token and add an entry to the MPTCP connection tracking table 390 successfully but fail to add an entry to the ordinary TCP connection tracking table 380. In this case, although we can still guarantee that the primary flow 115 goes to the correct backend with high probability, we cannot update the last valid time of the corresponding entry in the MPTCP connection tracking table 390, which results in a removal of the entry even though this key/token is still being used by the backend. That is, an entry's last valid time gets updated when the entry gets looked up. Since one failed to add an entry to the TCP table, you cannot get the token from the TCP table entry to look up the MPTCP table. Thus, the entry in MPTCP table never gets looked up and the last valid time cannot be updated. This mismatch between the load balancer and the backend can potentially result in key/token collision. An option to solve this is to use an extendable hash table over a fixed size hash table, for one or both of the TCP table and MPTCP table.

Regarding multiple forwarding threads as compared with multiple load balancers, multiple forwarding threads are equivalent to multiple load balancers conceptually for a non MPTCP-aware load balancer. Thus, previous work (see D. E. Eisenbud, at al., "Maglev: A fast and reliable software network load balancer, In NSDI, pages 523-535, 2016) utilizes multiple forwarding threads to drive per instance performance to the maximum and uses multiple instances to scale out load balancing service without any difficulty. However, this is equivalency is not maintained for an MPTCP-aware load balancer design. If we treat multiple forwarding threads and multiple load balancers equivalently, the token subspace of a load balancer can be noncontiguous. If a load balancer 340 can only know whether other instances go up or down without knowing whether a forwarding thread inside a particular instance is created or killed, then there can be a large disruption when a forwarding thread inside a load balancer is created or killed. Thus, in an exemplary embodiment, we can implement a 2-layer token space division using consistent hashing. At the top layer, we divide the token space between multiple load balancers, and at the bottom layer, we allocate each subspace of a load balancer to multiple forwarding threads.

4.2 Additional Implementation Aspects

As previously described, the implementation of connection tracking tables 380/390 may use timely entry timeout support. The reason is that if timely entry timeout is not supported, all tokens in a load balancer's subspace might be allocated without retrieval in the MPTCP connection tracking table 390 after running for a sufficient length of time. This means the table 390 may no longer support a new MPTCP connection. Thus, timers as previously described may be used to remove entries in the table(s) that are believed to no longer be for valid TCP subflows or MPTCP connections.

Figure 5A:
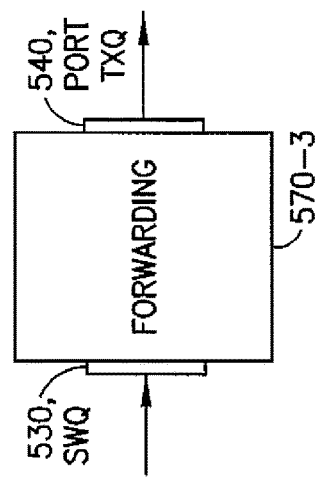
FIG. 5(a) illustrates a VIP matching thread.
Figure 5A:
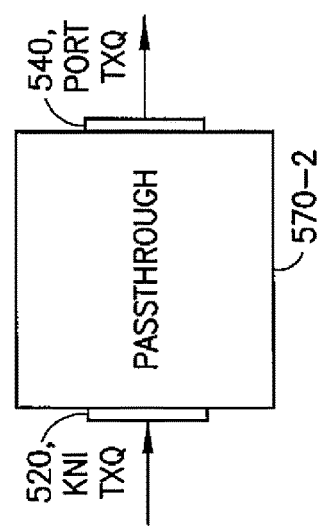
Figure 5A:
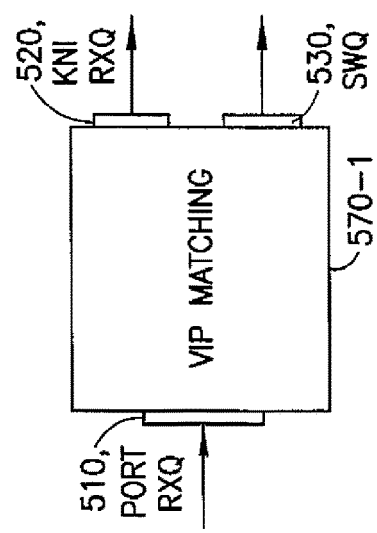

FIG. 5 illustrates three types of threads to implement an exemplary embodiment and the connections between threads, physical port, and Kernel NIC interface (KNI). FIG. 5(a) illustrates a VIP matching thread 570-1, FIG. 5(b) illustrates a passthrough thread 570-2, and FIG. 5(c) illustrates a forwarding thread 570-3. A VIP matching thread 570-1 receives packets from the RX queue of the physical port (port RXQ 510) and de-multiplexes the incoming traffic so that the packets destined to the VIP(s) go to the forwarding thread 570-3 via software queue SWQ 560 and other packets go to the KNI (e.g., KNI RXQ 520). The passthrough thread 570-2 receives packets, e.g., VIP route announcements, from KNI (see KNI TXQ 520)) and directly writes them to the TX queue of the physical port (e.g., Port TXQ 540). The forwarding thread 570-3 receives packets via software queue SWQ 530 and sends these to (and perhaps modifies these prior to sending to) the TX queue of the physical port (e.g., Port TXQ 540).

The MPTCP-aware load balancing logic examples described above are realized, e.g., in the forwarding thread 570-3. In order to drive per-instance performance toward or to the maximum, we can utilize multiple forwarding threads 570-3. In this case, we implement a 2-layer token space division using consistent hashing, as previously described. At the top layer, we divide the token space between multiple load balancers, and at the bottom layer, we allocate each subspace of a load balancer to multiple forwarding threads. The reason for this 2-layer token space division is that a load balancer probably can only know whether other instances go up or down without knowing whether a forwarding thread inside a particular instance is created or killed. As a result of it, if we treat multiple forwarding threads and multiple load balancers equivalently, there can be a large disruption when a forwarding thread inside a load balancer is created or killed.

Figure 6:
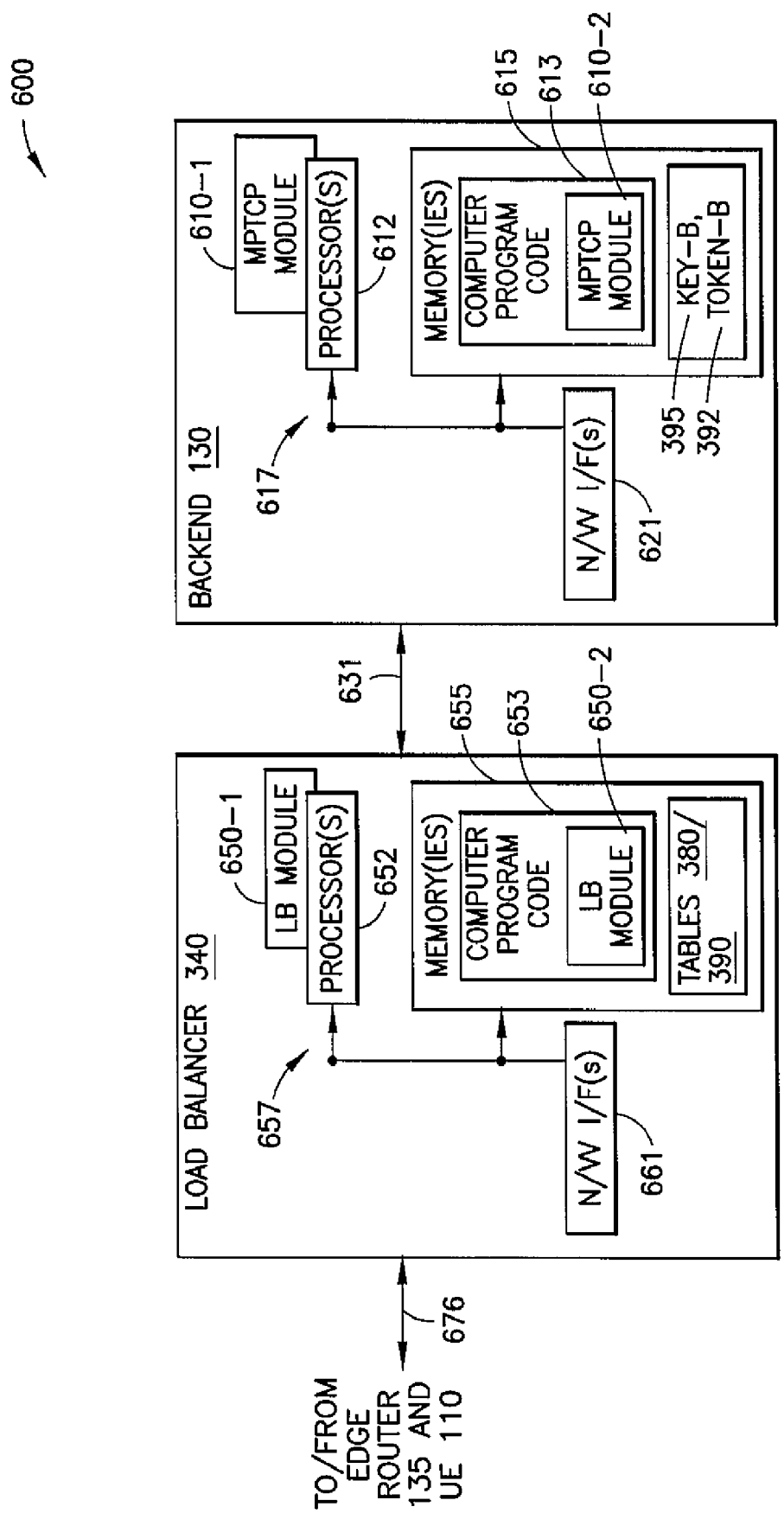
FIG. 6 is a block diagram of part of a communication system comprising an exemplary load balancer and a backend suitable for use with exemplary embodiments herein.

Referring FIG. 6 is a block diagram of part 600 of a communication system comprising an exemplary load balancer 340 and a backend 130, in accordance with an exemplary embodiment. The load balancer 340 includes one or more processors 652, one or more memories 655, and one or more network interfaces (N/W I/F(s)) 661, interconnected through one or more buses 657. The one or more memories 655 include computer program code 653 and the tables 380/390. The load balancer 340 includes a load balancing (LB) module 150, comprising one of or both parts 650-1 and/or 650-2, which may be implemented in a number of ways. The LB module 650 may be implemented in hardware as LB module 650-1, such as being implemented as part of the one or more processors 652. The LB module 650-1 may be implemented also as an integrated circuit or through other hardware such as a programmable gate array. In another example, the LB module 650 may be implemented as LB module 650-2, which is implemented as computer program code 653 and is executed by the one or more processors 652. For instance, the one or more memories 655 and the computer program code 653 are configured to, with the one or more processors 652, cause the load balancer 340 to perform one or more of the operations as described herein. The one or more network interfaces 661 communicate over a network such as via the links 676 and 631. The load balancer 340 communicates with the client 110 and the edge router 135 via link 676. The load balancer 340 communicates via link 631 with the backends (BEs) 130 of which a single backend 130 is shown. The links 676 and 631 may be wired or wireless or both, although typically wired is used to support the required speeds, and may implement an appropriate interface. The one or more buses 657 may be address, data, or control buses, and may include any interconnection mechanism, such as a series of lines on a motherboard or integrated circuit, fiber optics or other optical communication equipment, wireless channels, and the like.

The backend 130 comprises includes one or more processors 612, one or more memories 615, and one or more network interfaces (N/W I/F(s)) 621, interconnected through one or more buses 617. The one or more memories 615 include computer program code 613, one or more keys (e.g., key-b 395), and one or more tokens (e.g., token-b 392). The backend 130 includes an MPTCP module 610, comprising one of or both parts 610-1 and/or 610-2, which may be implemented in a number of ways. The MPTCP module 610 may be implemented in hardware as MPTCP module 610-1, such as being implemented as part of the one or more processors 612. The MPTCP module 610-1 may be implemented also as an integrated circuit or through other hardware such as a programmable gate array. In another example, the MPTCP module 610 may be implemented as LB module 610-2, which is implemented as computer program code 613 and is executed by the one or more processors 612. For instance, the one or more memories 615 and the computer program code 613 are configured to, with the one or more processors 612, cause the backend 130 to perform one or more of the operations as described herein. The one or more network interfaces 621 communicate over a network such as via the link 631. The load balancer 340 communicates with the client 110 and the edge router 135 via link 676. The one or more buses 617 may be address, data, or control buses, and may include any interconnection mechanism, such as a series of lines on a motherboard or integrated circuit, fiber optics or other optical communication equipment, wireless channels, and the like.

Figure 7A:
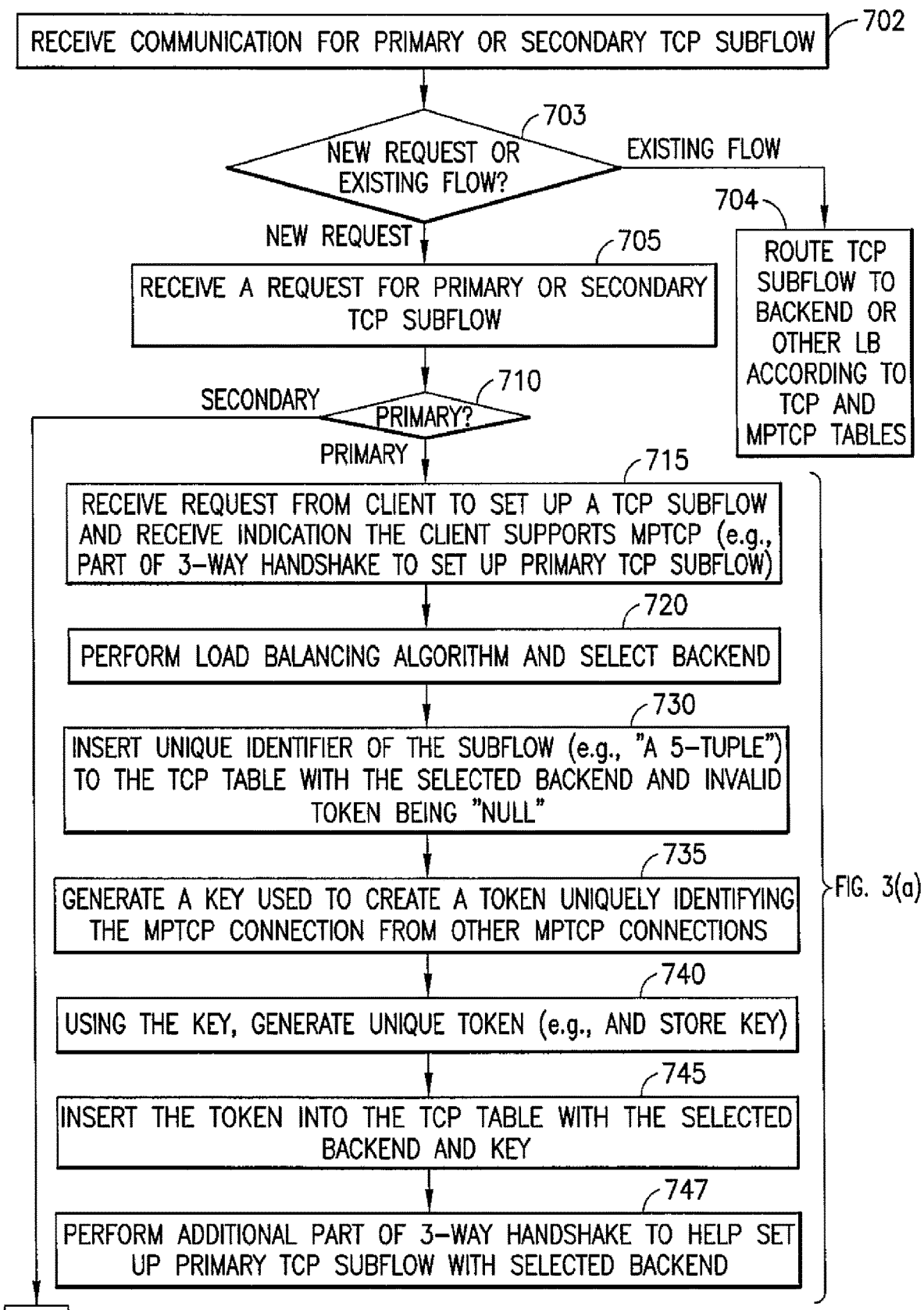

Referring to FIG. 7, which is split into FIGS. 7(a) and 7(b), is a logic flow diagram performed by an exemplary load balancer to implement MPTCP awareness in an exemplary embodiment. This figure illustrates the operation of an exemplary method or methods, a result of execution of computer program instructions embodied on a computer readable memory, functions performed by logic implemented in hardware, and/or interconnected means for performing functions in accordance with exemplary embodiments. The blocks in FIG. 7 are assumed to be performed by a load balancer 340 under control of the LB module 650, at least in part. The operations in FIG. 7 also correspond in part to those already illustrated in FIG. 3. For instance, FIG. 7(a) illustrates operations performed by the load balancer 340-1 in FIG. 3(a), and FIG. 7(b) illustrates operations performed by the load balancer 340-1 in FIG. 3(b) or by the load balancer 340-2 in FIG. 3(c).

Note that there could be multiple secondary TCP subflows, although only one secondary TCP subflow is described in the figures, including in FIG. 7. Also, there could be "normal" TCP flows without MPTCP, but these flows are not described in FIG. 7. For consistency, the term "subflow" for the TCP flows under MPTCP is also used, as the MPTCP is considered the "flow" and the TCP flows are subflows under the MPTCP connections 321. In terms of previous figures, the load balancer 340 could be either the load balancer 340-1 or the load balancer 340-2 (or other load balancers not shown, but for simplicity only these two load balancers are considered).

Blocks 705 and higher concern the initial set up, routing, and tracking of primary or secondary TCP subflows and corresponding MPTCP connections. Once the TCP subflows are set up and the TCP and MPTCP tables are also set up, then any subsequent communication for a TCP subflow is routed according to the TCP and MPTCP tables, such from the load balancer 340 to a corresponding backend 130 or from one load balancer to another. For instance, in block 702, the load balancer 340 receives a communication for a primary or secondary TCP subflow. If the communication is for a TCP subflow that is currently known (e.g., in the TCP and MPTCP tables) (block 703=Existing flow), then in block 704, the load balancer 340 routes the TCP subflow to a corresponding backend 130 or to another load balancer (LB) according to the TCP table 380 and MPTCP table 390. For a primary flow, one may use a 5-tuple (e.g., uniquely identifying the TCP subflow) to identify whether it is a new request. For a secondary flow, a token (e.g., token-b) may be used. FIG. 3 also shows this routing for requests for new TCP subflows, as do blocks 747, 770, and 780 of FIG. 7. These figures and blocks would be similar for communications for the TCP subflows 115/116 once the TCP subflow has been set up.

It is also noted that the TCP table 380 and MPTCP table 390 are described as such, but these could be combined if desired or stored in some other format, such as another type of data structure stored in memory.

If the communication for a TCP subflow is a new request (block 703—New request) for a subflow that is currently not known, e.g., not in the TCP or MPTCP tables, the flow diagram proceeds to block 705, where a load balancer 340 receives a request for a primary or secondary TCP flow. In block 710, the load balancer 340 determines whether the request is for a primary TCP subflow 315 or a secondary TCP subflow 316. If the request is for a primary TCP subflow 115 (block 710—Primary), the flow diagram proceeds to block 715. If the request is for a secondary TCP subflow 116 (block 710=Secondary), the flow diagram proceeds to block 750.

Blocks 715 to 747 in FIG. 7A illustrate operations performed by the load balancer 340-1 in FIG. 3(a), and reference may also be made to FIG. 3(a). In block 715, the load balancer 340 receives a request from a client 110 to set up a TCP subflow and receives an indication the client supports MPTCP (e.g., part of 3-way handshake to set up a primary TCP subflow). See also step 10 in FIG. 3(a). The load balancer 340 in block 720 performs a load balancing algorithm and selects a backend from the multiple backends 130. The load balancer 340 in block 730 inserts a unique identifier of the subflow (e.g., a 5-tuple 375) to the TCP table 380 with the selected backend and with (e.g., the currently invalid) token being "null". One reason to put selecting the backend to before the table insertion is that no matter what goes wrong in this logic, e.g., not enough space in the TCP table, backend selection should be performed. The load balancer 340 in block 735 generates a key (e.g., key-b 395) used to create a token (e.g., token-b 392-1) uniquely identifying the MPTCP connection 321 from other MPTCP connections.

The load balancer 340 in block 740, using the key, generates the unique token (e.g., token-b 392-1) and inserts (block 745) the token into the MPTCP table with the selected backend 340 and the key 395. The load balancer 340 in block 745 inserts the token into the TCP table with the selected backend and possibly the key. One reason to put updating the token field of the TCP table entry at the end of this part of the flow is that if there is an error in key/token allocation, e.g., not enough space in the MPTCP table, updating the token field of the TCP table entry can be skipped.

Additional part(s) of the 3-way handshake are performed in block 747 to help setup the primary TCP subflow 315 with the selected backend 130-1. See, e.g., step 11 of FIG. 3(a). Note that it is assumed that this ends this part of the flow diagram.

If the request is for a secondary TCP subflow 116 (block 710—Secondary), the flow diagram proceeds to block 750, shown in FIG. 7B. Blocks 750 to 780 in FIG. 7B illustrate operations performed by the load balancers 340-1 and 340-2 in FIGS. 3(b) and 3(c), and reference may also be made to these figures.

Blocks 750, 755, and 760 correspond to both FIGS. 3(a) and 3(b). In block 750, a load balancer 340 receives a request from a client 110 to set up a secondary TCP subflow 116 and receives an indication (e.g., token-b) of the corresponding MPTCP connection 321. See steps 13 and 16 of FIG. 3(b) or 3(c), respectively. In block 755, the load balancer 340 determines whether this MPTCP connection 321 is handled by this load balancer 340 or by another load balancer 340, by using token space division, e.g., using consistent hashing. Refer to FIG. 4 and corresponding text for possible token space division techniques. If the MPTCP connection 321 is handled by this load balancer 340 (block 760=This LB), the flow diagram proceeds to block 765, whereas if the MPTCP connection 321 is handled by a different load balancer 340 (block 760=A different LB), the flow diagram proceeds to block 775.

If the MPTCP connection 321 is on this load balancer 340 (block 760=This LB), this corresponds to FIG. 3(b) and to blocks 763, 765, and 770. The load balancer 340 in block 763 looks in its MPTCP table 390 using the token 392 and gets the backend for this MPTCP connection 321. The load balancer 346 in block 765 inserts into the TCP table 380 (e.g., see entry 381-2) information uniquely identifying the secondary TCP subflow 316 (e.g., 5-tuple-2 375-2), identifying the backend (e.g., backend_1 370-1), and uniquely identifying the MPTCP connection 331 (e.g., token-b 392-1). In block 770, the load balancer 340 routes the request to the identified backend, in this case backend 130-1 determined using the identifier backend_1 370-1. This includes performing an additional part of 4-way handshake to help set up the secondary TCP subflow with the identified backend. See also step 14 of FIG. 3(b). This part of the flow diagram ends.

If the MPTCP connection 321 is on a different load balancer 340 (block 760=A different LB), the flow diagram proceeds to block 775. Blocks 775 and 780 correspond to FIG. 3(c). In block 775, the load balancer 340 inserts information into the TCP table 310 uniquely identifying the secondary TCP subflow 116, identifying the load balancer handling the secondary subflow 116 (e.g., loadbalancer_1 315), and with a null. In block 780, the load balancer 340 routes the request to the load balancer handling the secondary subflow 116, which in the example of FIG. 3(a) is load balancer 340-1. See, e.g., step 7 of FIG. 3(c). This part of the flow diagram ends, but it is assumed that load balancer 340-1 would receive the request at block 705, then proceed to blocks 765 and 770.

Figure 8:
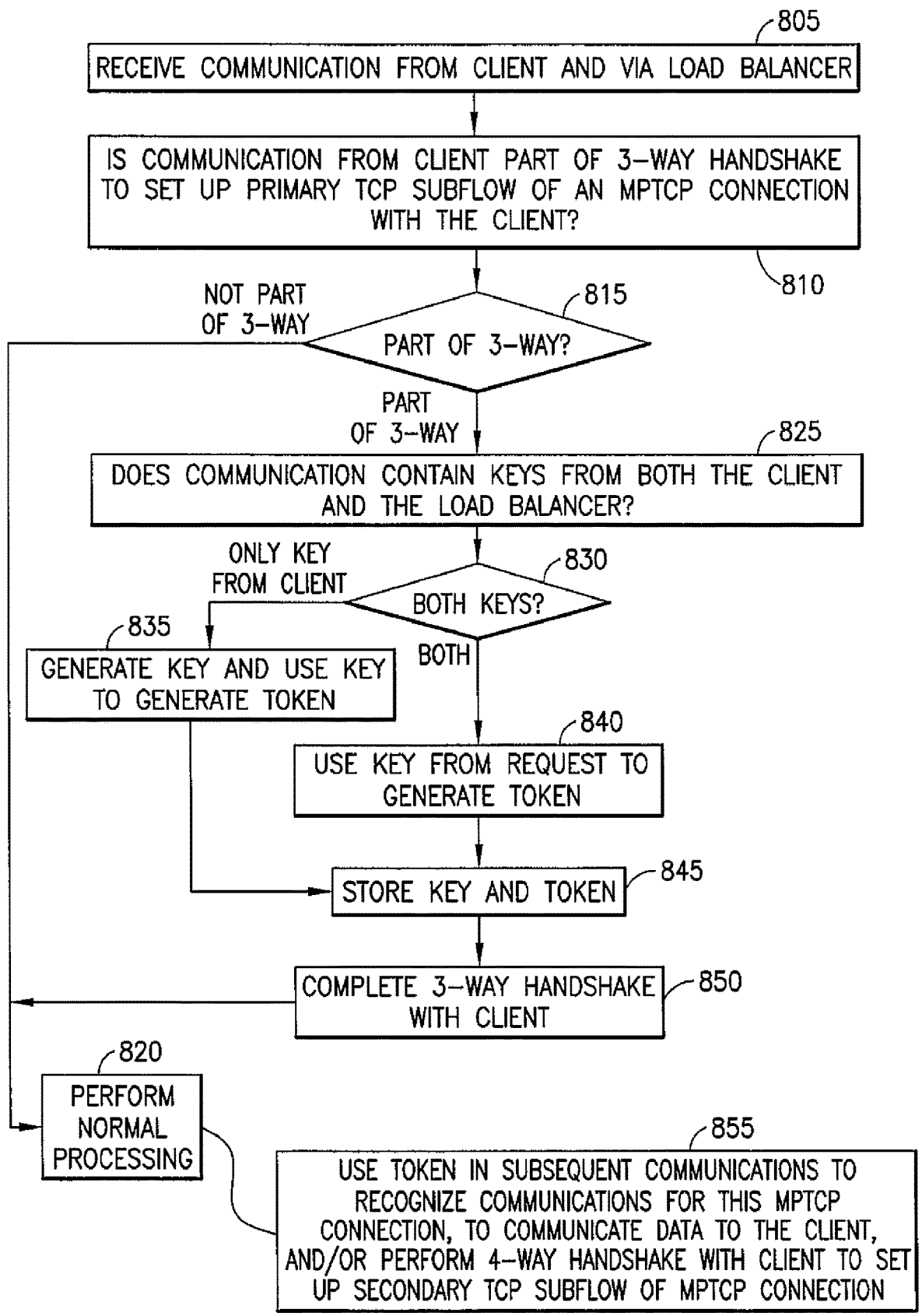
FIG. 8 is a logic flow diagram performed by an exemplary backend to implement MPTCP awareness in an exemplary embodiment and illustrates the operation of an exemplary method or methods, a result of execution of computer program instructions embodied on a computer readable memory, functions performed by logic implemented in hardware, and/or interconnected means for performing functions in accordance with exemplary embodiment.

Referring to FIG. 8, this figure is a logic flow diagram performed by an exemplary backend 130 to implement MPTCP awareness in an exemplary embodiment. This figure also illustrates the operation of an exemplary method or methods, a result of execution of computer program instructions embodied on a computer readable memory, functions performed by logic implemented in hardware, and/or interconnected means for performing functions in accordance with exemplary embodiment. The blocks in FIG. 8 are assumed to be performed by a backend 130, e.g., under control at least in part by the MPTCP module 610.

In block 805, the backend 130 receives a communication from a client and via a load balancer 340. The backend 130 determines (block 810) whether the communication from the client is part of a 3-way handshake to set up a primary TCP subflow 115 for an MPTCP connection 321 with the client. See, e.g., step 1 of FIG. 1 or step 11 of FIG. 3(a). If the communication is not part of a 3-way handshake (block 815=Not part of 3-way), then the backend 130 proceeds to block 820, described below.

If the communication is part of a 3-way handshake (block 815=Part of 3-way), the flow diagram proceeds to block 825. In block 825, the backend determines whether the communication contain keys from both the client and the load balancer. See the difference between step 1 in FIG. 2 and step 11 in FIG. 3(a). If only one key is received from the client 110 (block 830=Only one key from client), in block 835, the backend 130 performs its normal 3-way handshake processing, which is to generate a key (e.g., KEY-B in FIG. 2) in block 835 and generate a token (e.g., token-b) based on that key (block 835), store the key and token in block 845 (e.g., using the token in subsequent communications to recognize communications for this MPTCP connection), and complete the 3-way handshake (block 850). See also step 2 in FIG. 1. On the other hand, if the communication contain keys from both the client and the load balancer (block 830—Both), the backend 130 does not generate the key, as the load balancer 340 has already done this. Instead, block 840 is performed and the token is generated from the key provided in the request, the key and token are stored in block 845, and completes the 3-way handshake (block 850). See step 12 of FIG. 3(a). The flow proceeds to block 820.

In block 820, the backend 130 performs normal processing. Such operations may include those described in block 855, where the stored token is used with subsequent to recognize this MPTCP connection such as in a 4-way handshake to set up a secondary flow or to communicate data to the client for the primary TCP flow or secondary TCP flow of the MPTCP connection. For instance, a token received from the client is compared with stored tokens to determine TCP subflow and MPTCP connection status and perform actions accordingly.

5. Concluding Comments

In this document, we have presented exemplary designs for MPTCP-aware load balancers, which we believe have the capability of high performance and are widely deployable. Combined with the backward compatibility and middlebox-aware design of the MPTCP protocol itself; it is believed that MPTCP is going to be a key technology for ultra-broadband, ultra-reliable, ultra-low delay 5G mobile and fixed access.

The following are additional examples.

Example 1. A method, comprising: routing, by a load balancer, multipath transmission control protocol (MPTCP) connections and their corresponding transmission control protocol (TCP) subflows toward one or more selected backends, wherein each MPTCP connection is routed to a single one of a plurality of backend and is able to comprise at least primary and secondary TCP subflows, and wherein routing the MPTCP connections comprises performing, in response to setting up a primary TCP subflow of an MPTCP connection, load balancing of the MPTCP connection to select a selected one of the plurality of backends for the MPTCP connection; and tracking, by the load balancer, the MPTCP connections and their corresponding TCP subflows to enable routing of the MPTCP connections and their corresponding TCP subflows to the corresponding selected backends.

Example 2. The method of example 1, wherein the tracking further comprises determining for a request for a secondary TCP subflow of an MPTCP connection reaching the load balancer that the secondary TCP subflow is being handled by the load balancer, and routing the request to a selected backend corresponding to the MPTCP connection.

Example 3. The method of example 1, wherein the tracking further comprises determining for a request for a secondary TCP subflow of an MPTCP connection reaching the load balancer that the secondary TCP subflow is being handled by another load balancer, and routing the request to the other load balancer.

Example 4. The method of any one of examples 1 to 3, wherein tracking comprises tracking TCP subflows using a first table and tracking MPTCP connections using a second table.

Example 5. The method of any one of examples 1 to 4, wherein: the method further comprises, responsive to receiving at the load balancer and from a client a request to set up a primary TCP subflow for an MPTCP connection and an indication the client supports MPTCP, generating by the load balancer a key to be used to generate a token uniquely identifying the MPTCP connection from other MPTCP connections and generating the token using the key; and tracking the MPTCP connections and their corresponding TCP subflows further comprises inserting in memory the key, information uniquely identifying the primary TCP subflow, a corresponding identification of the specified backend for subsequent routing of the TCP subflows to the backend, and the token.

Example 6. The method of example 5, wherein generating the token using the key is performed by the load balancer so that a token space is divided using consistent hashing to guarantee a uniqueness of the token and also so that every one of a plurality of load balancers can compute a result of token space division so that this load balancer knows any other load balancer's token range.

Example 7. The method of example 6, further comprising regenerating the key in response to the generated key not meeting a requirement that a token corresponding to the key does not fall into the load balancer's token range.

Example 8. The method of example 6, wherein: load balancers $LB_1$, $LB_2$ ... $LB_n$ have IP addresses $IP_1$, $IP_2$, ..., $IP_n$; the method further comprises hashing these IP addresses to values $key_1$, $key_2$, $key_3$, ..., $key_n$ on the RANGE $R=(0$ to $(2^{32}-1))$; the load balancer, $LB_i$, has address $IP_i$, and a hash_32($IP_i$)=key; and the method further comprises mapping $key_i$ to a circle of range R and assigning a subrange of range R to the load balancer $LB_i$ as follows: from the $key_i$, looking to the center of the circle, all values to the right and until a nearest neighbor of the load balancer $LB_i$ on the right hand side are assigned to the load balancer $LB_i$.

Example 9. The method of example 5, wherein the information uniquely identifying this primary TCP subflow comprises a 5-tuple.

Example 10. The method of example 5, wherein the inserting in the memory is performed in response to receiving a primary TCP subflow for an MPTCP connection that is not currently stored in memory according to a comparison of first information uniquely identifying the primary TCP subflow for the request with second information uniquely identifying other primary TCP subflows contained in the memory and determining there is no match between the first and second information.

Example 11. The method of example 5, wherein tracking the MPTCP connections and their corresponding TCP subflows further comprises, responsive to receiving a secondary TCP subflow for an MPTCP connection, inserting information into the memory uniquely identifying the secondary TCP subflow, information identifying the specified backend, and the token uniquely identifying the MPTCP connection of which the TCP subflow is part from other MPTCP connections.

Example 12. The method of any one of examples 1 to 11, further comprising using timers to determine an MPTCP connection or one or more TCP subflows of an MPTCP connection for which no packets have been received during one or more time periods, and removing the MPTCP connection and its corresponding TCP subflows or removing the one or more subflows of an MPTCP connection in response to corresponding timers expiring after the one or more time periods.

Example 13. An apparatus, comprising: means for routing, by a load balancer, multipath transmission control protocol (MPTCP) connections and their corresponding transmission control protocol (TCP) subflows toward one or more selected backends, wherein each MPTCP connection is routed to a single one of a plurality of backend and is able to comprise at least primary and secondary TCP subflows, and wherein routing the MPTCP connections comprises performing, in response to setting up a primary TCP subflow of an MPTCP connection, load balancing of the MPTCP connection to select a selected one of the plurality of backends for the MPTCP connection; and means for tracking, by the load balancer, the MPTCP connections and their corresponding TCP subflows to enable routing of the MPTCP connections and their corresponding TCP subflows to the corresponding selected backends.

Example 14. The apparatus of example 13, further comprising means for performing the method of any one of examples 2 to 12.

Example 15. A load balancer comprising an apparatus of any of examples 13 or 14.

Example 16. A method, comprising: at a backend in a communication system, determining whether a request by a client to set up a primary transmission control protocol (TCP) subflow of a multipath TCP (MPTCP) connection already includes a key used to generate a token used to uniquely identify the MPTCP connection from other MPTCP connections; generating by the backend the token based on the key from the request; and using by the backend the token to distinguish subsequent communications for the MPTCP connection.

Example 17. The method of example 16, wherein using by the backend the token to distinguish subsequent communications for the MPTCP connection further comprises using the token to communicate data to the client for this MPTCP connection.

Example 18. The method of any one of examples 16 to 17, wherein using by the backend the token to distinguish subsequent communications for the MPTCP connection further comprises using the token to setup a secondary TCP subflow of the MPTCP connection.

Example 19. The method of example 18, further comprising using received tuples to distinguish between the primary TCP subflow and the secondary TCP subflow.

Example 20. An apparatus, comprising: means, at a backend in a communication system, for determining whether a request by a client to set up a primary transmission control protocol (TCP) subflow of a multipath TCP (MPTCP) connection already includes a key used to generate a token used to uniquely identify the MPTCP connection from other MPTCP connections; means for generating by the backend the token based on the key from the request; and means for using by the backend the token to distinguish subsequent communications for the MPTCP connection.

Example 21. The apparatus of example 20, further comprising means for performing the method of any one of examples 17 to 19.

Example 22. A backend comprising an apparatus of any of examples 20 or 21.

Example 23. A system comprising an apparatus of any of examples 13 or 14 and an apparatus of any of examples 20 or 21.

Example 24. A computer program comprising code for performing the method of any one of examples 1 to 12 or 16 to 19, when the computer program is run on a processor.

Example 25. The computer program according to example 24, wherein the computer program is a computer program product comprising a computer-readable medium bearing computer program code embodied therein for use with a computer.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 6. A computer-readable medium may comprise a computer-readable storage medium (e.g., memories 655 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:
ACK acknowledge
ARP address resolution protocol
BE backend
DNS domain name system
DPDK data plane development kit
DSR direct server return
ECMP equal cost multi path
eNB (or eNodeB) evolved Node B (e.g., an LTE base station)
HMAC hashed message authentication code
id or ID identification
I/F interface
IP Internet protocol
KNI Kernel NIC interface
LB load balancing
LRU least recently used
LTE long term evolution
MAC media access control
MIMO multiple input, multiple output
MU-MIMO multi-user MIMO
MPTCP multipath TCP
MME mobility management entity
NCE network control element
NIC network interface controller
N/W network
OFDMA orthogonal frequency division multiple access
Rx receiver
SCTP stream control transmission protocol
SF subflow
SGW serving gateway
SYN synchronize
tbl table
TCP transmission control protocol
TCP/IP transmission control protocol/Internet protocol
Tx transmitter
UDP user datagram protocol
UE user equipment (e.g., a wireless, typically mobile device)
VIP virtual IP

What is claimed is:

1. A method, comprising:
routing, with a load balancer, multipath transmission control protocol connections and their corresponding transmission control protocol subflows toward one or more selected backends, wherein each multipath transmission control protocol connection is routed to a single one of a plurality of backends and is able to comprise at least primary and secondary transmission control protocol sub flows, and wherein routing the multipath transmission control protocol connections comprises performing, in response to setting up a primary transmission control protocol subflow of a multipath transmission control protocol connection, load balancing of the multipath transmission control protocol connection to select a selected one of the plurality of backends for the multipath transmission control protocol connection; and
tracking, with the load balancer, the multipath transmission control protocol connections and their corresponding transmission control protocol subflows to enable routing of the multipath transmission control protocol connections and their corresponding transmission control protocol subflows to the corresponding selected backends, wherein the tracking further comprises determining for a request for a secondary transmission control protocol subflow of a multipath transmission control protocol connection reaching the load balancer that the secondary transmission control protocol subflow is being handled with another load balancer, and routing the request to the other load balancer.

2. The method of claim 1, wherein the tracking further comprises determining for a request for a secondary transmission control protocol subflow of a multipath transmission control protocol connection reaching the load balancer that the secondary transmission control protocol subflow is being handled with the load balancer, and routing the request to a selected backend corresponding to the multipath transmission control protocol connection.

3. The method of claim 1, wherein tracking comprises tracking transmission control protocol subflows using a first table and tracking multipath transmission control protocol connections using a second table.

4. A method, comprising:
routing, with a load balancer, multipath transmission control protocol connections and their corresponding transmission control protocol subflows toward one or more selected backends, wherein each multipath transmission control protocol connection is routed to a single one of a plurality of backends and is able to comprise at least primary and secondary transmission control protocol sub flows, and wherein routing the multipath transmission control protocol connections comprises performing, in response to setting up a primary transmission control protocol subflow of a multipath transmission control protocol connection, load balancing of the multipath transmission control protocol connection to select a selected one of the plurality of backends for the multipath transmission control protocol connection; and
tracking, with the load balancer, the multipath transmission control protocol connections and their corresponding transmission control protocol subflows to enable routing of the multipath transmission control protocol connections and their corresponding transmission control protocol subflows to the corresponding selected backends,
wherein:
the method further comprises: responsive to receiving at the load balancer and from a client a request to set up a primary transmission control protocol subflow for an multipath transmission control protocol connection and an indication the client supports multipath transmission control protocol, generating with the load balancer a key to be used to generate a token uniquely identifying the multipath transmission control protocol connection from other multipath transmission control protocol connections and generating the token using the key; and
tracking the multipath transmission control protocol connections and their corresponding transmission control protocol subflows further comprises inserting in memory the key, information uniquely identifying the primary transmission control protocol subflow, a corresponding identification of the specified backend for subsequent routing of the transmission control protocol subflows to the backend, and the token.

5. The method of claim 4, wherein generating the token using the key is performed with the load balancer so that a token space is divided using consistent hashing to guarantee a uniqueness of the token and also so that every one of a plurality of load balancers can compute a result of token space division so that this load balancer knows any other load balancer's token range.

6. The method of claim 5, further comprising regenerating the key in response to the generated key not meeting a requirement that a token corresponding to the key does not fall into the load balancer's token range.

7. The method of claim 5, wherein:
load balancers $LB_1, LB_2 \ldots LB_n$ have IP addresses $IP_1, IP_2, \ldots, IP_n$;
the method further comprises hashing these IP addresses to values $key_1, key_2, key_3, \ldots, key_n$ on the RANGE $R=(0$ to $(2^{32}-1))$;
the load balancer, $LB_i$, has address $IP_i$, and a hash_32 $(IP_i)=key_i$; and
the method further comprises mapping $key_i$ to a circle of range R and assigning a subrange of range R to the load balancer $LB_i$, as follows: from the $key_i$, looking to the center of the circle, all values to the right and until a nearest neighbor of the load balancer $LB_i$, on the right hand side are assigned to the load balancer $LB_i$.

8. The method of claim 4, wherein the information uniquely identifying this primary transmission control protocol subflow comprises a 5-tuple.

9. The method of claim 4, wherein the inserting in the memory is performed in response to receiving a primary transmission control protocol subflow for an multipath transmission control protocol connection that is not currently stored in memory according to a comparison of first information uniquely identifying the primary transmission control protocol subflow for the request with second information uniquely identifying other primary transmission control protocol subflows contained in the memory and determining there is no match between the first and second information.

10. The method of claim 4, wherein tracking the multipath transmission control protocol connections and their corresponding transmission control protocol sub flows further comprises, responsive to receiving a secondary transmission control protocol subflow for an multipath transmission control protocol connection, inserting information into the memory uniquely identifying the secondary transmission control protocol subflow, information identifying the specified backend, and the token uniquely identifying the multipath transmission control protocol connection of which the transmission control protocol subflow is part from other multipath transmission control protocol connections.

11. The method of claim 1, further comprising using timers to determine an multipath transmission control protocol connection or one or more transmission control protocol subflows of an multipath transmission control protocol connection for which no packets have been received during one or more time periods, and removing the multipath transmission control protocol connection and its corresponding transmission control protocol sub flows or removing the one or more subflows of an multipath transmission control protocol connection in response to corresponding timers expiring after the one or more time periods.

12. An apparatus, comprising:
one or more processors; and
one or more memories including computer program code, wherein the one or more memories and the computer program code are configured to, with the one or more processors, cause the apparatus to perform at least the following:
route, with a load balancer, multipath transmission control protocol connections and their corresponding transmission control protocol subflows toward one or more selected backends, wherein each multipath transmission control protocol connection is routed to a single one of a plurality of backends and is able to comprise at least primary and secondary transmission control protocol subflows, and wherein routing the multipath transmission control protocol connections comprises performing, in response to setting up a primary transmission control protocol subflow of an multipath transmission control protocol connection, load balancing of the multipath transmission control protocol connection to select a selected one of the plurality of backends for the multipath transmission control protocol connection; and
track, with the load balancer, the multipath transmission control protocol connections and their corresponding transmission control protocol subflows to enable routing of the MPTCP connections and their corresponding transmission control protocol subflows to the corresponding selected backends, wherein the tracking further comprises determining for a request for a secondary transmission control protocol subflow of a multipath transmission control protocol connection reaching the load balancer that the secondary transmission control protocol subflow is being handled with another load balancer, and routing the request to the other load balancer.

13. A non-transitory computer readable medium, comprising code for performing the method of claim 1, when the code is run on an apparatus comprising one or more processors.

14. The apparatus of claim 12, wherein the tracking further comprises determining for a request for a secondary transmission control protocol subflow of a multipath transmission control protocol connection reaching the load balancer that the secondary transmission control protocol subflow is being handled with the load balancer, and routing the request to a selected backend corresponding to the multipath transmission control protocol connection.

15. The apparatus of claim 12, wherein tracking comprises tracking transmission control protocol subflows using a first table and tracking multipath transmission control protocol connections using a second table.

16. The apparatus of claim 12, wherein the one or more memories and the computer program code are further configured to, with the one or more processors, cause the apparatus to perform at least the following: using timers to determine an multipath transmission control protocol connection or one or more transmission control protocol subflows of an multipath transmission control protocol connection for which no packets have been received during one or more time periods, and removing the multipath transmission control protocol connection and its corresponding transmission control protocol sub flows or removing the one or more subflows of an multipath transmission control protocol connection in response to corresponding timers expiring after the one or more time periods.

17. An apparatus, comprising:
one or more processors; and
one or more memories including computer program code, wherein the one or more memories and the computer program code are configured to, with the one or more processors, cause the apparatus to perform at least the following:
route, with a load balancer, multipath transmission control protocol connections and their corresponding transmission control protocol subflows toward one or more selected backends, wherein each multipath transmission control protocol connection is routed to a single one of a plurality of backends and is able to comprise at least primary and secondary transmission control protocol sub flows, and wherein routing the multipath transmission control protocol connections comprises performing, in response to setting up a primary transmission control protocol subflow of a multipath transmission control protocol connection, load balancing of the multipath transmission control protocol connection to select a selected one of the plurality of backends for the multipath transmission control protocol connection; and track, with the load balancer, the multipath transmission control protocol connections and their corresponding transmission control protocol subflows to enable routing of the multipath transmission control protocol connections and their corresponding transmission control protocol subflows to the corresponding selected backends, wherein:

the one or more memories and the computer program code are configured to, with the one or more processors, cause the apparatus to perform at least the following:

responsive to receiving at the load balancer and from a client a request to set up a primary transmission control protocol subflow for an multipath transmission control protocol connection and an indication the client supports multipath transmission control protocol, generating with the load balancer a key to be used to generate a token uniquely identifying the multipath transmission control protocol connection from other multipath transmission control protocol connections and generating the token using the key; and tracking the multipath transmission control protocol connections and their corresponding transmission control protocol subflows further comprises inserting in memory the key, information uniquely identifying the primary transmission control protocol subflow, a corresponding identification of the specified backend for subsequent routing of the transmission control protocol subflows to the backend, and the token.

18. The apparatus of claim 17, wherein generating the token using the key is performed with the load balancer so that a token space is divided using consistent hashing to guarantee a uniqueness of the token and also so that every one of a plurality of load balancers can compute a result of token space division so that this load balancer knows any other load balancer's token range.

19. The apparatus of claim 18, wherein the one or more memories and the computer program code are further configured to, with the one or more processors, cause the apparatus to perform at least the following: regenerating the key in response to the generated key not meeting a requirement that a token corresponding to the key does not fall into the load balancer's token range.

20. The apparatus of claim 18, wherein:

load balancers $LB_1, LB_2 \ldots LB_n$ have IP addresses $IP_1, IP_2, \ldots, IP_n$;

the method further comprises hashing these IP addresses to values $key_1, key_2, key_3, \ldots, key_n$ on the RANGE $R=(0$ to $(2^{32}-1))$;

the load balancer, $LB_i$, has address $IP_i$, and a hash_32 $(IP_i)=key_i$; and the method further comprises mapping $key_i$ to a circle of range R and assigning a subrange of range R to the load balancer $LB_i$, as follows: from the $key_i$, looking to the center of the circle, all values to the right and until a nearest neighbor of the load balancer $LB_i$, on the right hand side are assigned to the load balancer $LB_i$.

21. The apparatus of claim 17, wherein the information uniquely identifying this primary transmission control protocol subflow comprises a 5-tuple.

22. The apparatus of claim 17, wherein the inserting in the memory is performed in response to receiving a primary transmission control protocol subflow for an multipath transmission control protocol connection that is not currently stored in memory according to a comparison of first information uniquely identifying the primary transmission control protocol subflow for the request with second information uniquely identifying other primary transmission control protocol subflows contained in the memory and determining there is no match between the first and second information.

23. The apparatus of claim 17, wherein tracking the multipath transmission control protocol connections and their corresponding transmission control protocol sub flows further comprises, responsive to receiving a secondary transmission control protocol subflow for an multipath transmission control protocol connection, inserting information into the memory uniquely identifying the secondary transmission control protocol subflow, information identifying the specified backend, and the token uniquely identifying the multipath transmission control protocol connection of which the transmission control protocol subflow is part from other multipath transmission control protocol connections.

24. A non-transitory computer readable medium, comprising code for performing the method of claim 4, when the code is run on an apparatus comprising one or more processors.

* * * * *